US009119128B2

(12) United States Patent
Ruparelia et al.

(10) Patent No.: US 9,119,128 B2
(45) Date of Patent: Aug. 25, 2015

(54) SYSTEM AND METHOD FOR INTELLIGENT ROUTEBACK

(75) Inventors: Mitul Ruparelia, Wembley (GB); Ilan Dar, San Jose, CA (US); Yusuf Hasan, Fairfax, VA (US); Alexandre Saez, Lognes (FR)

(73) Assignee: Sybase 365, Inc., Reston, VA (US)

( * ) Notice: Subject to any disclaimer, the term of this patent is extended or adjusted under 35 U.S.C. 154(b) by 127 days.

(21) Appl. No.: 13/231,186

(22) Filed: Sep. 13, 2011

(65) Prior Publication Data

US 2012/0063388 A1 Mar. 15, 2012

Related U.S. Application Data

(60) Provisional application No. 61/382,991, filed on Sep. 15, 2010.

(51) Int. Cl.
*H04L 12/28* (2006.01)
*H04W 40/02* (2009.01)
*H04L 12/58* (2006.01)
*H04L 12/725* (2013.01)

(52) U.S. Cl.
CPC ........... *H04W 40/02* (2013.01); *H04L 12/5895* (2013.01); *H04L 51/38* (2013.01); *H04L 45/306* (2013.01)

(58) Field of Classification Search
CPC .......... H04W 64/00; H04W 4/02; H04B 1/38; H04L 12/5895; H04L 45/306; H04L 51/38
USPC .......... 370/351; 709/203, 206, 226, 238–244
See application file for complete search history.

(56) References Cited

U.S. PATENT DOCUMENTS

| 7,024,462 | B1 | 4/2006 | McErlean |
| 7,154,901 | B2 | 12/2006 | Chava et al. |
| 7,269,431 | B1* | 9/2007 | Gilbert .......................... 455/466 |
| 8,743,689 | B2* | 6/2014 | Stephens ....................... 370/235 |
| 2002/0090963 | A1* | 7/2002 | Avalos et al. ................ 455/466 |
| 2004/0196858 | A1 | 10/2004 | Tsai et al. |
| 2005/0164721 | A1* | 7/2005 | Yeh et al. ...................... 455/466 |
| 2006/0077926 | A1* | 4/2006 | Rune ............................. 370/328 |
| 2007/0043813 | A1* | 2/2007 | Pickup .......................... 709/206 |
| 2007/0066326 | A1 | 3/2007 | Agarwal et al. |
| 2007/0076857 | A1* | 4/2007 | Chava et al. ................ 379/88.17 |
| 2007/0127436 | A1* | 6/2007 | Karimi-Cherkandi et al. ............................ 370/352 |
| 2008/0025326 | A1* | 1/2008 | Kumar et al. ................. 370/401 |
| 2008/0039104 | A1* | 2/2008 | Gu et al. ....................... 455/445 |
| 2008/0153527 | A1* | 6/2008 | Knotts .......................... 455/466 |
| 2008/0163250 | A1* | 7/2008 | Caron ........................... 719/314 |

(Continued)

OTHER PUBLICATIONS

PCT International Search Report and Written Opinion, PCT/US11/51382, Jan. 20, 2012, 8 pages.

*Primary Examiner* — Chandrahas Patel
*Assistant Examiner* — Lan Huong Truong
(74) *Attorney, Agent, or Firm* — Kenyon & Kenyon LLP

(57) ABSTRACT

An intelligent routeback mechanism that may inter alia receive from an entity (such as for example a wireless carrier) aspects of the entity's messaging traffic, data, etc. with the intelligent routeback mechanism aiding the (1) return (optionally augmented, optionally transformed, etc.) to the entity of that portion of the traffic, data, etc. that the entity is able to deliver itself and (2) delivery of that portion of the traffic, data, etc. that the entity is unable to deliver itself. Such an intelligent routeback mechanism may reside in inter alia a Messaging Inter-Carrier Vendor.

17 Claims, 21 Drawing Sheets

(56) References Cited

U.S. PATENT DOCUMENTS

| | | | |
|---|---|---|---|
| 2009/0047967 A1* | 2/2009 | Zhu et al. | 455/445 |
| 2009/0088189 A1* | 4/2009 | Hardy et al. | 455/466 |
| 2009/0111492 A1 | 4/2009 | Dudley et al. | |
| 2010/0076853 A1* | 3/2010 | Schwarz | 705/15 |
| 2010/0205259 A1* | 8/2010 | Vitaldevara et al. | 709/206 |
| 2011/0264807 A1* | 10/2011 | Hlibiciuc et al. | 709/227 |
| 2011/0289164 A1* | 11/2011 | Griset et al. | 709/206 |

\* cited by examiner

SYSTEM AND METHOD FOR INTELLIGENT ROUTEBACK

This application claims the benefit of U.S. Provisional Patent Application Ser. No. 61/382,991, filed on 15 Sep. 2010, which is herein incorporated by reference in its entirety.

BACKGROUND

1. Field of the Invention

The present invention relates generally to telecommunications services. More particularly, the present invention relates to capabilities that enhance substantially the value and usefulness of various communication and data exchange paradigms including, inter alia, Short Message Service (SMS), Multimedia Message Service (MMS), Internet Protocol (IP) Multimedia Subsystem (IMS), Wireless Application Protocol (WAP), the transfer of various forms of data (such as inter alia signaling and command-and-control data, data from/to software applications such as games, etc.), Electronic Mail (E-Mail), Instant Messaging (IM), etc.

2. Background of the Invention

As the 'wireless revolution' continues to march forward through various flavors of 2G, 3G, 4G, and beyond, the importance to a Mobile Subscriber (MS)—for example a user of a Wireless Device (WD) that is serviced by possibly inter alia a Wireless Carrier (WC)—of their WD grows substantially. Examples of WDs include, possibly inter alia, mobile telephones, handheld computers, Internet-enabled phones, pagers, radios, TVs, audio devices, car audio (and other) systems, recorders, text-to-speech devices, bar-code scanners, net appliances, mini-browsers, personal data assistants (PDAs), etc.

One consequence of such a growing importance is the resulting ubiquitous nature of WDs—i.e., MSs carry them at almost all times and use them for an ever-increasing range of activities. For example, MSs employ their WDs to, possibly inter alia:

1) Exchange (e.g., SMS, MMS, etc.) messages, content (such as inter alia pictures and other static images; songs and other quanta of audio data; movies, streaming video, and other quanta of video data; data from software applications such as games), etc. with other MSs (e.g., "Let's meet for dinner at 6", etc.) through Peer-to-Peer, or P2P, messaging.

2) Secure information (such as, for example, weather updates, travel alerts, news updates, sports scores, etc.), participate in voting initiatives (such as, for example, with the television show American Idol®), exchange content (such as for example pictures and other static images; songs and other quanta of audio data; movies, streaming video, and other quanta of video data; games and other software applications; etc.), interact with social networking sites, etc. through various of the available Application-to-Peer, or A2P, based service offerings.

3) Engage in Mobile Commerce (which, broadly speaking, encompasses the buying and selling of merchant-supplied products, goods, and services through a WD) and Mobile Banking (which, broadly speaking, encompasses performing various banking activities through a WD).

As just one usage example, around the world during 2009 there were over five trillion SMS messages exchanged and in North America during just the first half of 2010 over one trillion SMS messages were exchanged.

Coincident with the rapid growth of WDs has been the desire of WCs, and other entities within a mobile ecosystem, to among other things (1) offer to MSs a continuing stream of new and interesting products and services that, possibly inter alia, attract new MSs and retain existing MSs, leverage or exploit the continually increasing features and capabilities of new WDs, incrementally increase the volume of traffic (and the revenue that is associated with same) that flows through a mobile ecosystem and (2) establish and manage their inter-WC connections, and administer the traffic that traverses same, in ways that among other things minimizes various factors (including for example cost, administrative burdens, operational challenges, etc.) and maximizes various factors (including for example utilization, etc.).

Attaining the different desires or goals that were referenced above may raise a host of (for example and inter alia connectivity, communication, processing, routing, performance, billing, etc.) issues which may impact or preclude the attainment of such goals.

As just one example, a hypothetical WC ABC will likely establish and maintain bilateral agreements (encompassing among other things the particulars governing the exchange of [e.g., SMS, MMS, etc.] traffic and data, billing constraints, etc.) with some number of other WCs (based on for example and possibly inter alia various criteria such as geographic operating region, MS population size, etc.). Such agreements are typically 'expensive' (e.g., time consuming to establish, logistically and technically challenging to implement and to maintain, etc.) and thus WC ABC will frequently limit (based on various constraints such as for example geographic reach, etc.) the number of agreements that it will pursue.

Such a limitation by WC ABC leaves WC ABC at a disadvantage vis-à-vis the many hundred of other WCs that exist. For example, a MS of WC ABC would be unable to interact (e.g., exchange SMS, MMS, etc. messages, etc.) with the MSs of one or more of the other WCs and a MS of any of the other WCs (such as for example WC XYZ) would be unable to interact (e.g., exchange SMS, MMS, etc. messages, etc.) with a MS of WC ABC.

It would be desirable to have a single entity, a Messaging Inter-Carrier Vendor (MICV) that inter alia operates as a trusted intermediary, that any entity (such as for example WCs like WC ABC, WC XYZ, etc.) may connect to, and exchange traffic, data, etc. with, where the MICV inter alia:

1) Establishes and maintains all of the various business (e.g., bilateral agreements, etc.), technical (e.g., communication protocols, security, etc.), operational (e.g., Quality of Service [QoS] constraints, Service Level Agreement [SLA] requirements, routing rules, etc.), etc. arrangements that yield a fully-interconnected ecosystem with the MICV at the center or hub of such an ecosystem, and 2) Performs comprehensive, authoritative, etc. routing and switching operations thus freeing each of the connected entities (e.g., WC ABC, WC XYZ, etc.) from among other things needing to individually address all of the business, technical, operational, etc. challenges that naturally arise were each entity to pursue connecting directly with any number of other entities.

Aspects of the present invention fill the lacuna that was noted above by (1) providing (within inter alia a MICV) an intelligent routeback capability to expeditiously process and route a wide range of information (including inter alia SMS, MMS, IMS, etc. messages; Session Initiation Protocol [SIP]-addressed artifacts; application data; WAP-based exchanges; E-Mail messages; signaling, command-and-control, application, etc. data; IM messages; etc.) while (2) addressing, in new and innovatory ways, various of the not insubstantial challenges that are associated with same.

The intelligent routeback mechanism may inter alia support an entity (such as for example a WC) sending for example all of their out-of-network (e.g., SMS, MMS, etc.) traffic, data, etc. to a MICV with the intelligent routeback mechanism aiding the:

1) Return (optionally augmented with various indicators and/or other data elements, optionally with various data elements transformed or manipulated, etc.) to the entity of that portion of the traffic, data, etc. that was received from the entity that the entity is able to deliver itself (e.g., where the entity has in place a bilateral agreement with a particular destination entity) for subsequent delivery by the entity, and 2) Delivery, by the MICV, of that portion of the traffic, data, etc. that was received from the entity that the entity is unable to deliver itself (e.g., where the entity has no bilateral agreement with a particular destination entity).

Through such a capability an entity such as a WC immediately gains the benefit of a MICV's extended network of entities (e.g., other WCs), without inter alia any of the associated business, operational, etc. costs and challenges, and among other things the enhanced revenue that comes along with such an extended network.

SUMMARY OF THE INVENTION

One embodiment of the present invention offers a server-based method for directing a quanta of data involving at least (1) receiving a quanta of data from a sending entity, the quanta of data comprising a destination address and content, (2) identifying from the content a type indicator, (3) using at least routing data and aspects of the destination address to identify a receiving entity, (4) based on at least (a) a set of rules comprising delivery routes available to the sending entity, (b) the receiving entity, and (c) the type indicator, either (a) returning aspects of the quanta of data to the sending entity or (b) delivering aspects of the quanta of data towards the receiving entity.

Another embodiment of the present invention offers a processor-based system for directing a quanta of data including at least (1) a first gateway configured to receive a quanta of data from a sending entity, the quanta of data comprising a destination address and content, (2) workflow modules configured to (a) identify from the content a type indicator, (b) identify, using at least routing data and aspects of the destination address, a receiving entity, (c) based on at least (i) a set of rules comprising delivery routes available to the sending entity, (ii) the receiving entity, and (iii) the type indicator, either (i) return via a second gateway aspects of the quanta of data to the sending entity or (ii) deliver via a third gateway aspects of the quanta of data towards the receiving entity, (3) a repository configured to preserve aspects of the results of the different processing steps, and (4) an administrator.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

Figure 1:
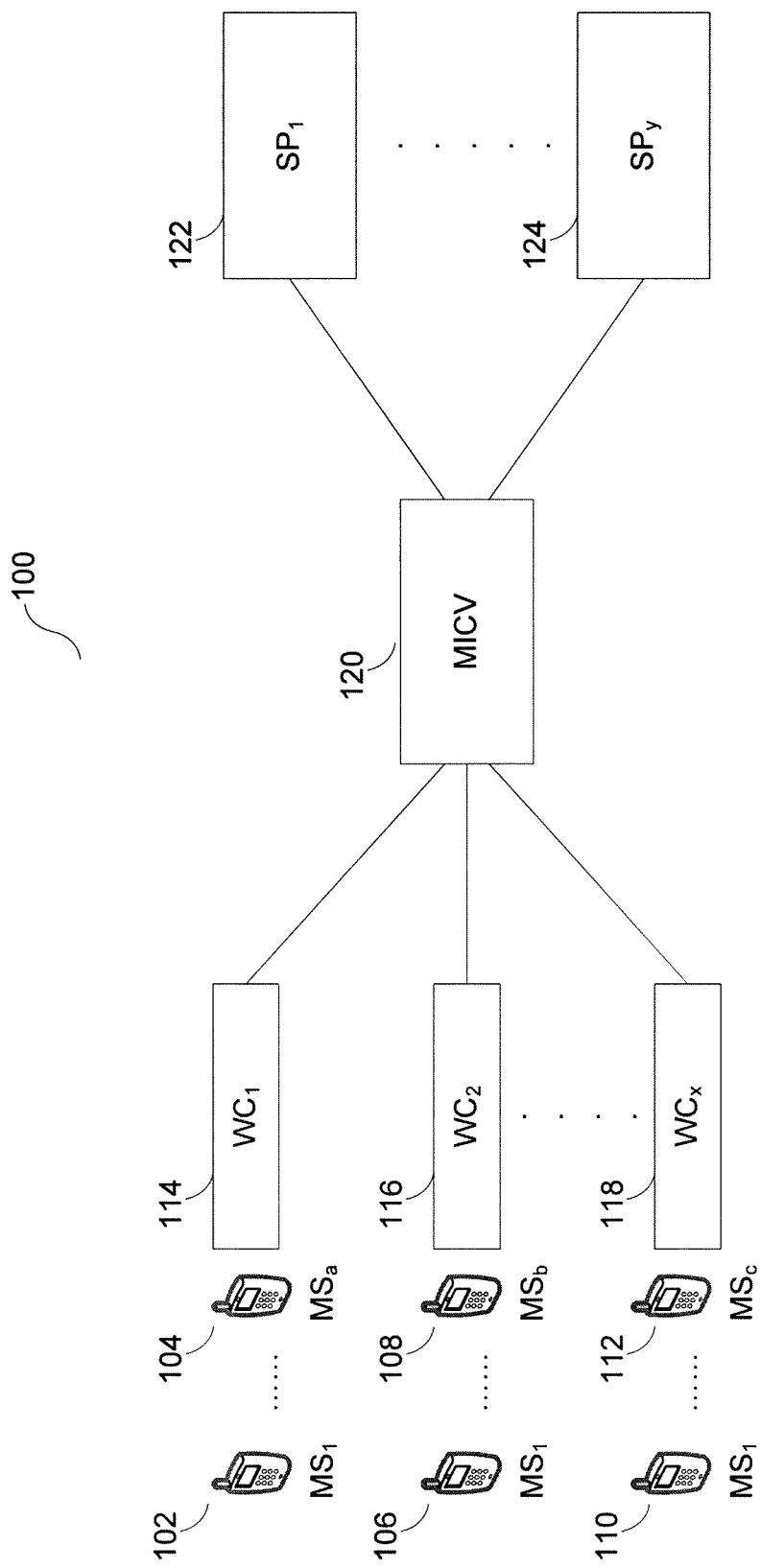
FIG. 1 is a diagrammatic presentation of an exemplary MICV.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In the discussion below aspects of the present invention are described and illustrated as residing within a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a discussion of the concept of a MICV, a summary of various of the services/functions/etc. that may be performed by a MICV, and a discussion of the numerous advantages that may arise from same.

In the discussion below aspects of the present invention are described and illustrated as being offered by a Service Provider (SP). A SP may, for example, be realized through any combination of, possibly inter alia, any one or more of (1) an element of a WC, an element of a landline carrier, an element of a MICV, or multiple such elements working together; (2) a Third-Party (3P) such as possibly inter alia a merchant, a Content Provider (CP, such as for example a news organization, an advertising agency, a brand, etc.), or a financial institution; (3) multiple 3P entities working together; (4) a 3P service bureau; etc.

As illustrated in FIG. 1 and reference numeral 100, under one particular arrangement a MICV 120 may be disposed between, possibly inter alia, multiple WCs ($WC_1$ 114, $WC_2$ 116→$WC_x$ 118) and multiple SPs ($SP_1$ 122→$SP_y$ 124) and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124 (and other entities that nay be connected to the MICV), and 2) A SP 122→124 (and other entities that may be connected to the MICV) with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS←→MS, MS←→SP, etc.) messaging traffic:

1) A WC may elect to route just their out-of-network messaging, signaling, data, etc. traffic to a MICV. Under this approach the MICV would have visibility (e.g., access, etc.) to just the portion of the WC's traffic that was directed to the MICV by the WC.

2) A WC may elect to route all of their messaging, signaling, data, etc. traffic to a MICV. The MICV may, possibly among other things, subsequently return to the WC that portion of the traffic that belongs to (i.e., that is destined for a MS of) the WC. Under this approach the MICV would have visibility (e.g., access, etc.) to all of the WC's traffic.

Figure 2:
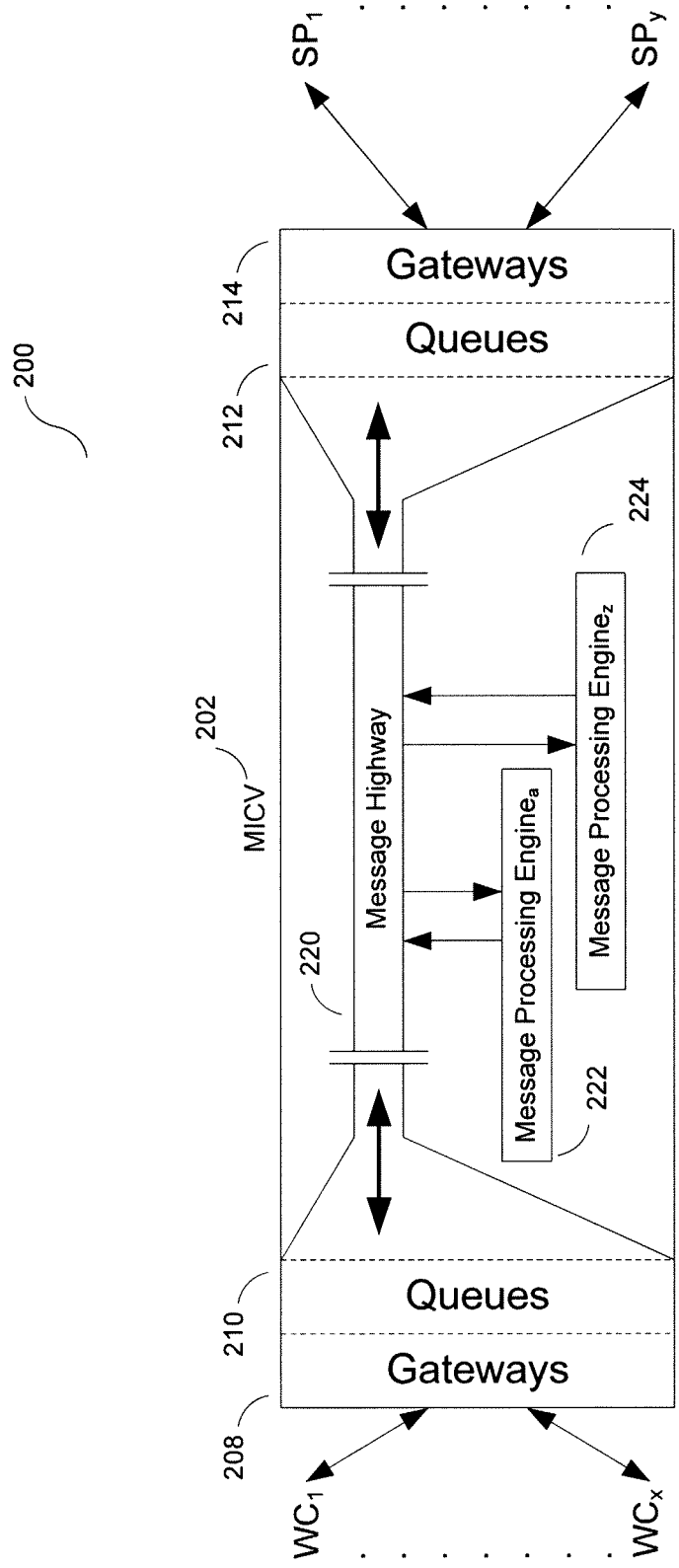
FIG. 2 illustrates various implementation aspects of an exemplary MICV.

For purposes of illustration, FIG. 2 and reference numeral 200 depict a possible logical implementation of aspects of a MICV 202 under one particular arrangement. The figures depict among other things Gateways (208 and 214 that for example provide information/data receipt and dispatch capabilities across possibly inter alia different application-level communication protocols), Queues (210 and 212 that for example provide interim storage and buffering capabilities), a Message or Data Highway (DH 220, that for example provides interconnection capabilities), and DPEs 222→224.

Figure 3:
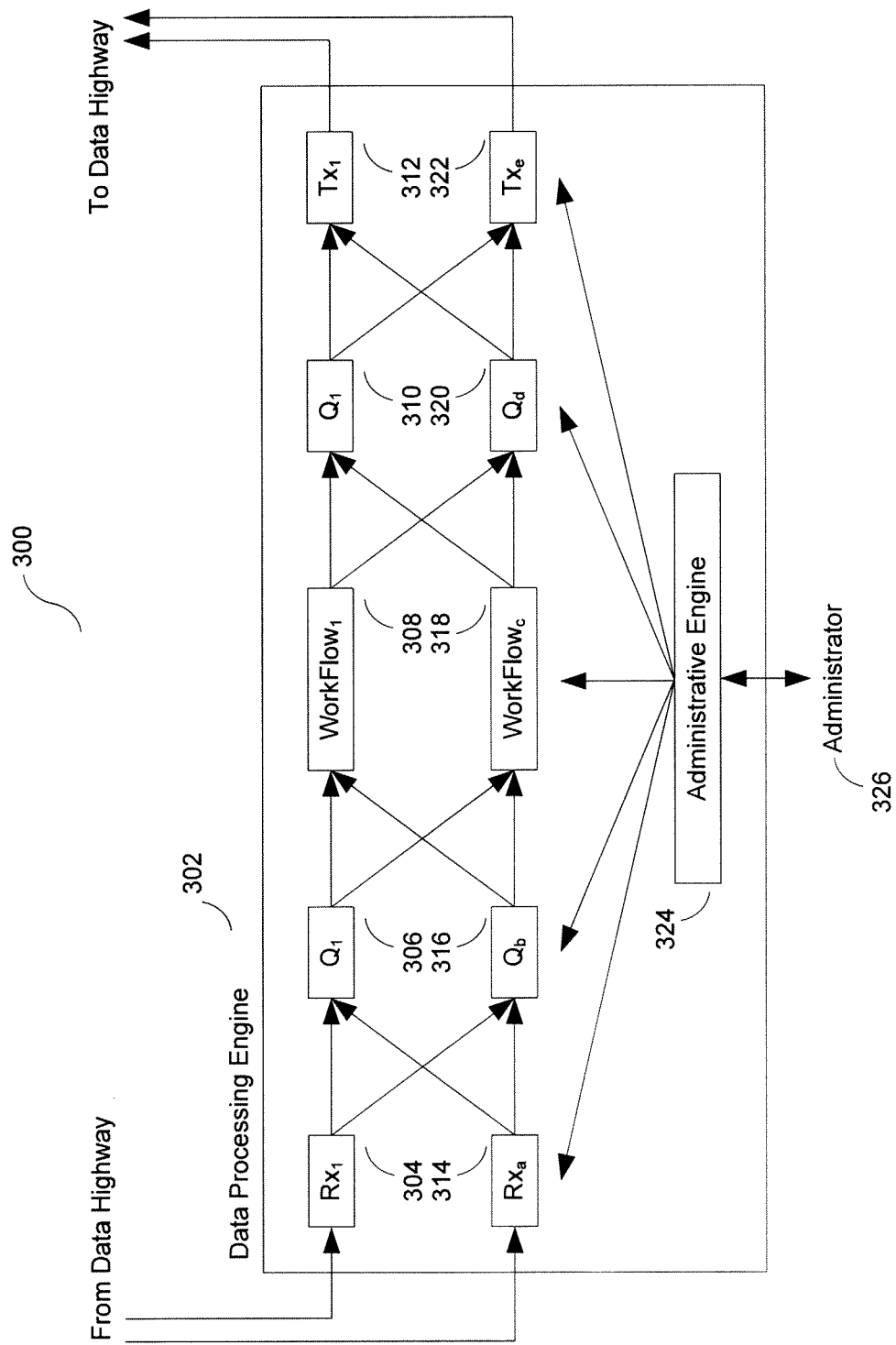
FIG. 3 illustrates various implementation aspects of an exemplary MICV Data Processing Engine (DPE).

FIG. 3 and reference numeral 300 depict a possible logical implementation of aspects of a DPE 302. A DPE may contain several key components—Receivers ($Rx_1$ 304→$Rx_a$ 314 in the diagram), Queues ($Q_1$ 306→$Q_b$ 316 and $Q_1$ 310→$Q_d$ 320 in the diagram), WorkFlows ($WorkFlow_1$ 308→$WorkFlow_c$ 318 in the diagram), Transmitters ($Tx_1$ 312→$Tx_e$ 322 in the diagram), and an Administrator 326. It will be readily apparent to one of ordinary skill in the relevant art that numerous other components are possible within a DPE.

A dynamically updateable set of one or more Receivers ($Rx_1$ 304→$Rx_a$ 314 in the diagram) 'get' messages from a MICV DH and deposit them on an intermediate or temporary Queue ($Q_1$ 306→$Q_b$ 316 in the diagram) for subsequent processing.

A dynamically updateable set of one or more Queues ($Q_1$ 306→$Q_b$ 316 and $Q_1$ 310→$Q_d$ 320 in the diagram) operate as intermediate or temporary buffers for incoming and outgoing messages.

A dynamically updateable set of one or more WorkFlows ($WorkFlow_1$ 308→$WorkFlow_c$ 318 in the diagram) remove incoming messages from an intermediate or temporary Queue ($Q_1$ 306→$Q_b$ 316 in the diagram), perform all of the required operations on the messages, and deposit the processed messages on an intermediate or temporary Queue ($Q_1$ 310→$Q_d$ 320 in the diagram). The WorkFlow component will be described more fully below.

A dynamically updateable set of one or more Transmitters ($Tx_1$ 312→$Tx_e$ 322 in the diagram) remove processed messages from an intermediate or temporary Queue ($Q_1$ 310→$Q_d$ 320 in the diagram) and 'put' the messages on a MICV DH.

An Administrative Engine 324 provides a linkage to all of the different components of a DPE so that a DPE, along with all of the different components of a DPE, may be fully and completely administered or managed 326.

While portions of the discussion below will reference a MICV, it will be readily apparent to one of ordinary skill in the relevant art that numerous other arrangements are equally possible and indeed are fully within the scope of the present invention.

Aspects of a MICV may 'plug into' different layers/levels of legacy, current, and/or future technology and among other things may for example facilitate interoperation between such technologies.

For example, from a traditional messaging context an entity (such as for example a WC, a 3P such as a CP, etc.) may direct their Short Message Service Center (SMSC) complexes, their Multimedia Message Service Center (MMSC) complexes, etc. to connect to a single, simple, consolidated, etc. interface mechanism that is exposed by a MICV and subsequently seamlessly exchange message traffic.

For example, from a traditional wireless context an entity (such as a WC, etc.) may direct aspects of their infrastructure to connect to a single, simple, consolidated, etc. interface mechanism that is exposed by a MICV and subsequently seamlessly exchange SS7-based and/or IP-based signaling data, General Packet Radio Service (GPRS) Roaming Exchange (GRX) data, location and presence data, etc.

Figure 9:
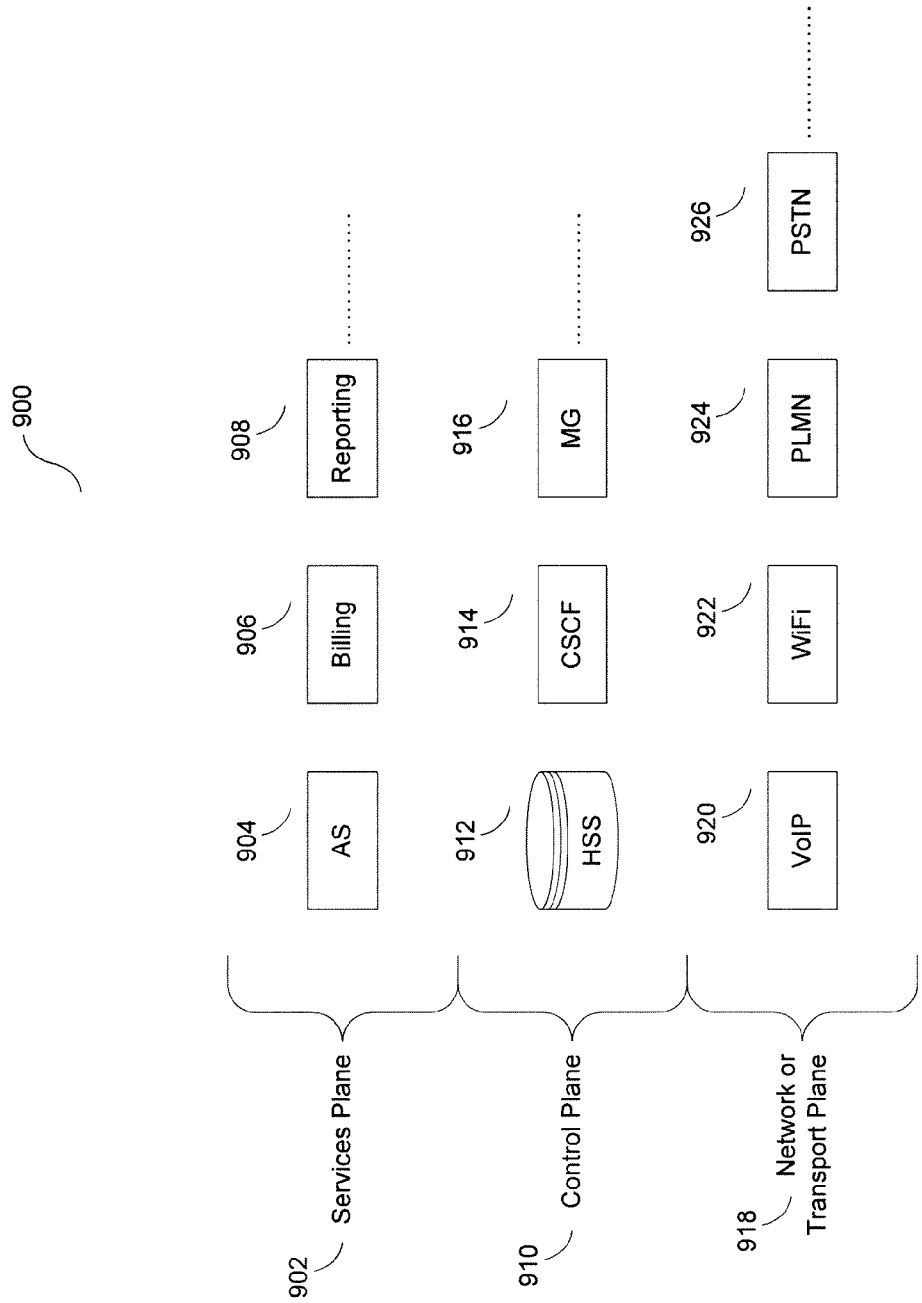
FIG. 9 is a diagrammatic presentation of the three logical IMS planes.

For example, from an IMS context:

1) FIG. 9 and reference numeral 900 illustrate IMS' three logical planes:

a) Services Plane 902. For example, one or more Application Server (AS) instances 904, Billing facilities 906, Reporting facilities 908, etc.

b) Control Plane 910. For example, a Home Subscriber Server (HSS) capability 912, a Call Session Control Function (CSCF) capability 914, one or more Media Gateway (MG) instances 916, etc.

c) Network or Transport Plane 918. Support, interfaces, etc. for, possibly inter alia, Voice over IP (VoIP) 920, WiFi 922, Public Land Mobile Network (PLMN) 924, Public Switched Telephone Network (PSTN) 926, etc.

Figure 10:
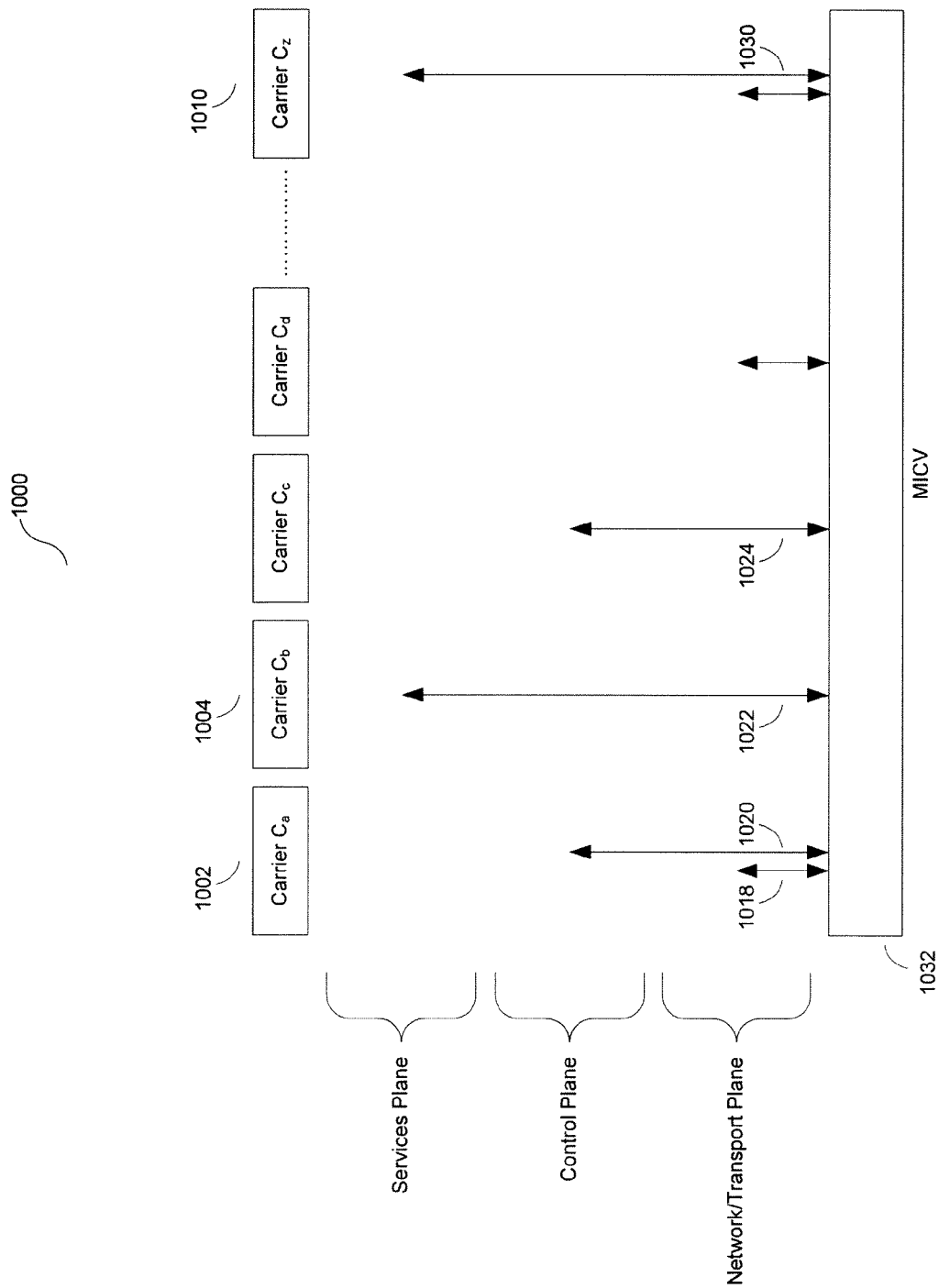
FIG. 10 illustrates exemplary logical connections of multiple carriers that is possible under aspects of the instant invention.

2) FIG. 10 and reference numeral 1000 depict how the different functional elements of an entity (e.g., carriers such as $C_a$ 1002→$C_z$ 1010, 3Ps such as CPs and others, etc.) within an ecosystem may plug into a MICV's single access/connection point 1032—e.g., elements of carrier Ca's 1002 Control Plane and Network or Transport Plane may plugin to a MICV's single access/connection point 1018→1020, elements of carrier Cb's 1004 Services Plane may plug into a MICV's single access/connection point 1022. Similar access points may be realized at 1024→1030.

Figure 11:
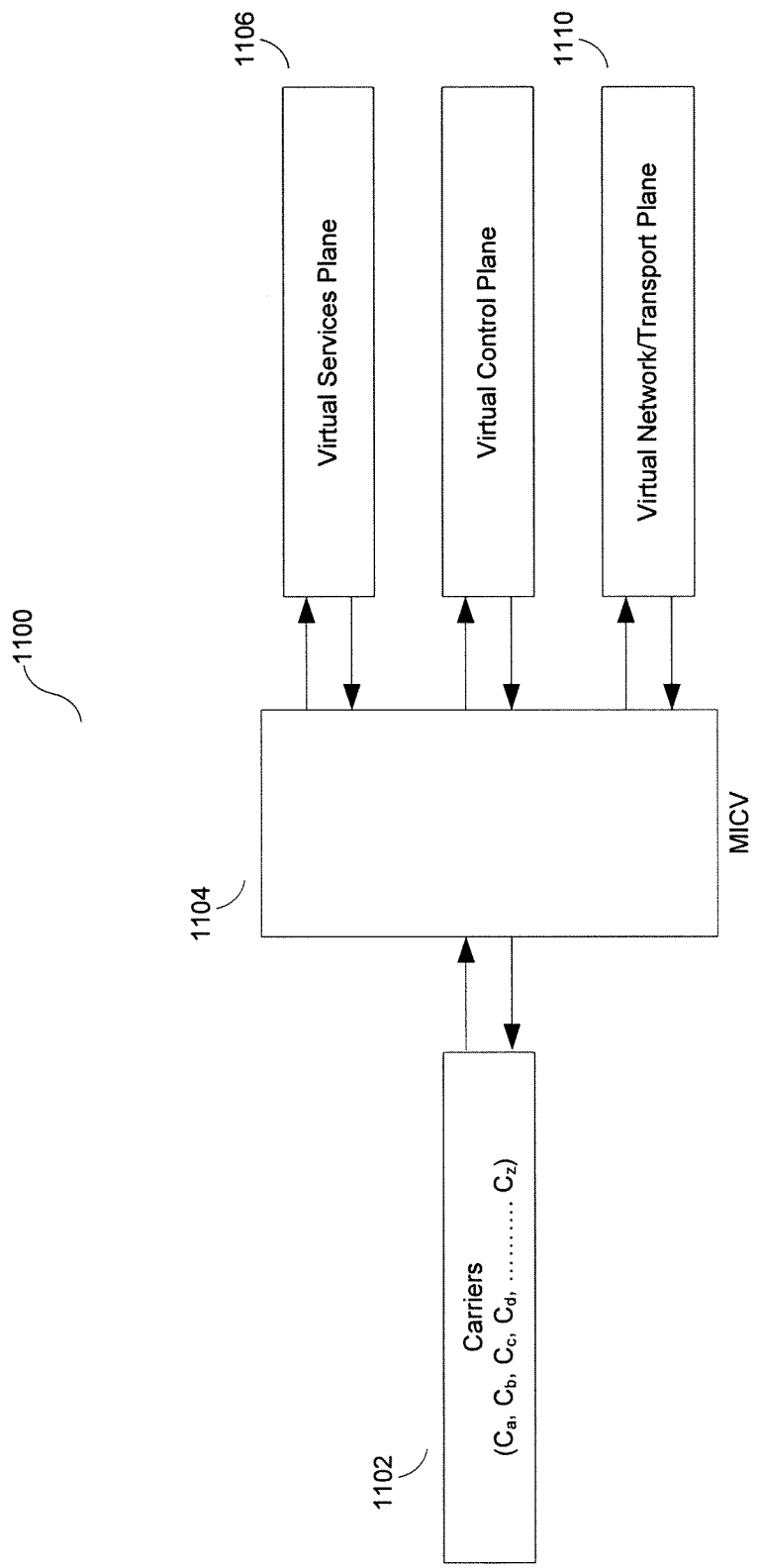
FIG. 11 is a diagrammatic presentation of the virtual implementation of the three logical IMS planes within aspects of the present invention.

3) FIG. 11 and reference numeral 1100 illustrate how the single access/connection point 1104 serves much like a façade, behind which connected entities (e.g., carriers such as $C_a \rightarrow C_z$ 1102, 3Ps such as CPs and others, etc.) may access one or more of the virtual implementations of a MICV's logical planes 1106→1110.

Thus, for example, as a carrier's environment grows and changes, as a carrier's business needs and models change and evolve, as a carrier deploys new service offerings, etc. it can, possibly among other things, plug into (and thus take advantage of the features and functions that are offered by) different combinations of the virtual implementations of a MICV's logical planes all through the single access/communication point.

Additionally, placing the virtual planes behind a single façade allows for, possibly among other things, ongoing and dynamic changes, updates, etc. to the physical implementation of a plane without any impact on, or interruptions to, any of the connected entities.

Figure 16:
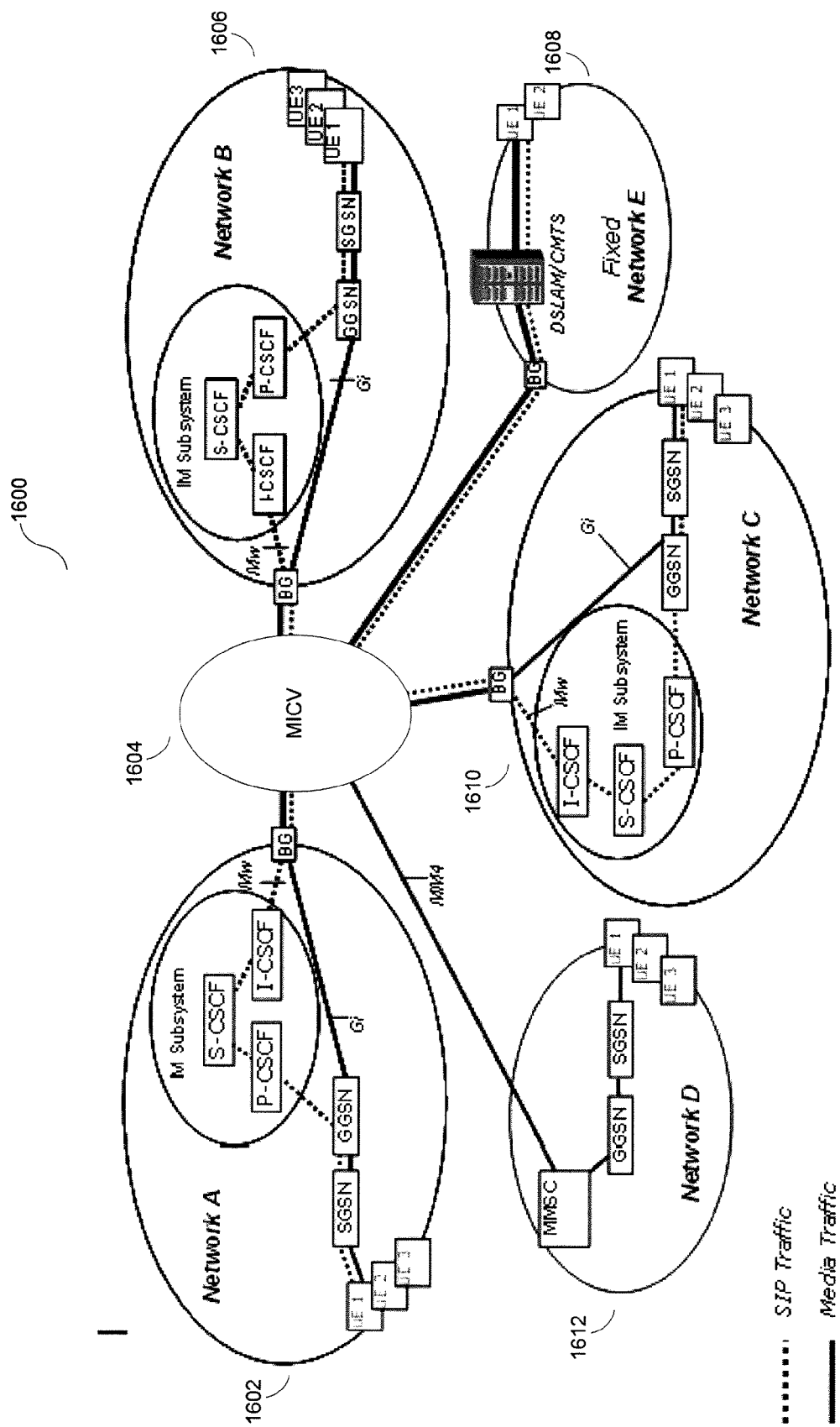
FIG. 16 illustrates one particular IMS-centric arrangement that is possible through aspects of the present invention.

4) FIG. 16 and reference numeral 1600 depict one particular IMS-centric arrangement that is possible through aspects of the present invention—Networks A 1602, B 1606, and C 1610 represent hypothetical IMS-enabled or IMS-capable carriers; Network D 1612 represents a hypothetical non-IMS-enabled carrier that offers, possibly inter alia, MMS services; and Network E 1608 represents a hypothetical fixed (e.g., landline) carrier that offers, possibly inter alia, Digital Subscriber Line (DSL) services. A MICV 1604 may among other things tie together the different (disparate, natively incompatible, etc.) environments. The depicted arrangement is illustrative only and it will be readily apparent to one of ordinary skill in the relevant art that numerous other arrangements are easily possible and indeed are fully within the scope of the present invention.

Central to the operation of a MICV is the unit of information within a MICV that is received, manipulated or otherwise operated on, dispatched, etc. Unlike prior environments that might operate just on, and thus potentially be limited just to, an SMS message or a MMS message, the unit of information within a MICV is a more general quanta of data. Accordingly a MICV is natively capable of operating on inter alia an SMS message, a MMS message, an IMS message, an E-Mail message, a VoIP data stream, a video data stream [e.g., a movie, a video conference call, etc.], a voice telephone call, signaling and other command-and-control data, an audio data stream [e.g., a song, etc.], IM data, games and other software applications, pictures and other static images, data from software applications such as games, etc.

Figure 13:
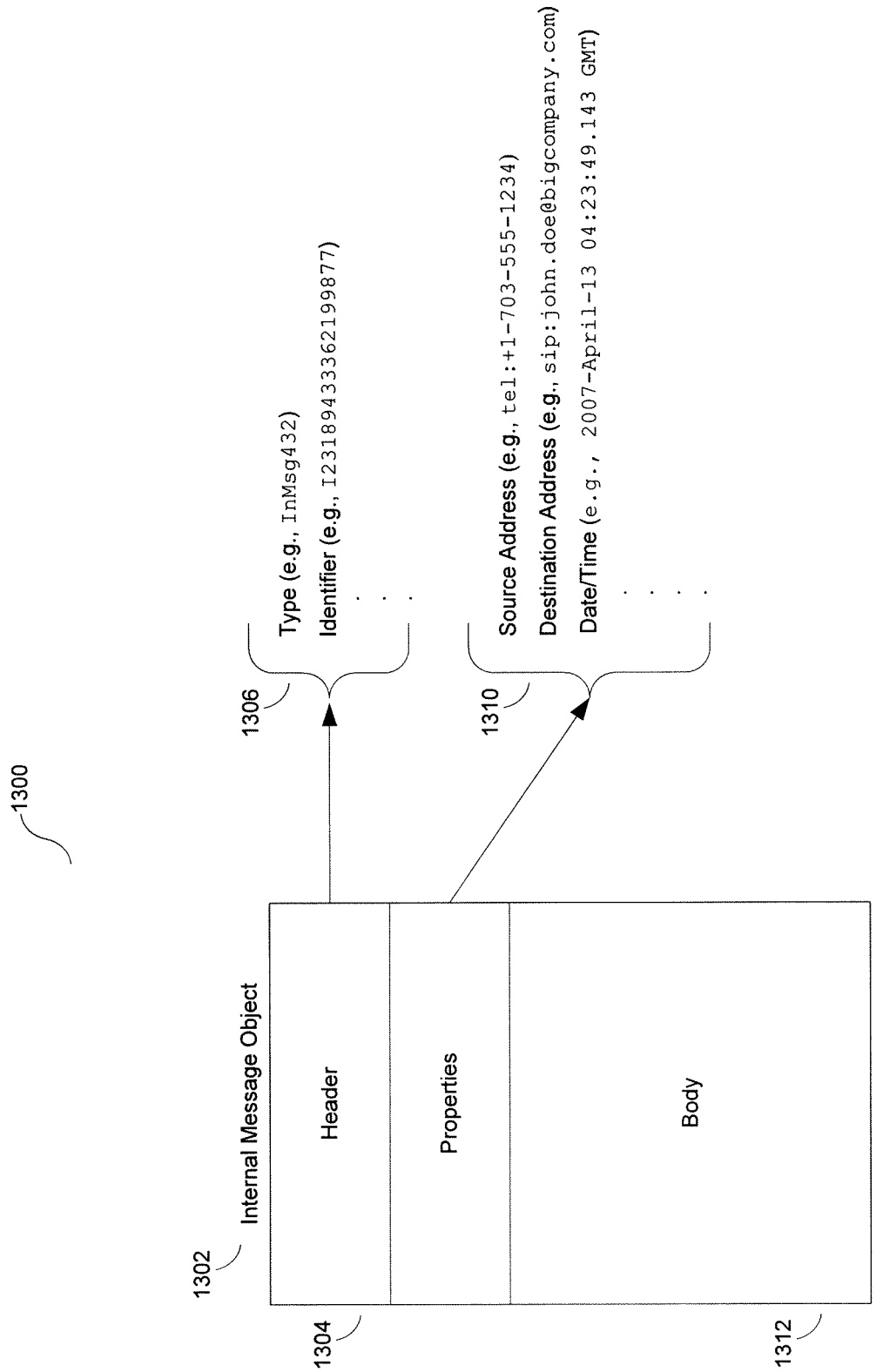
FIG. 13 illustrates aspects of an exemplary IMO.
Figure 15:
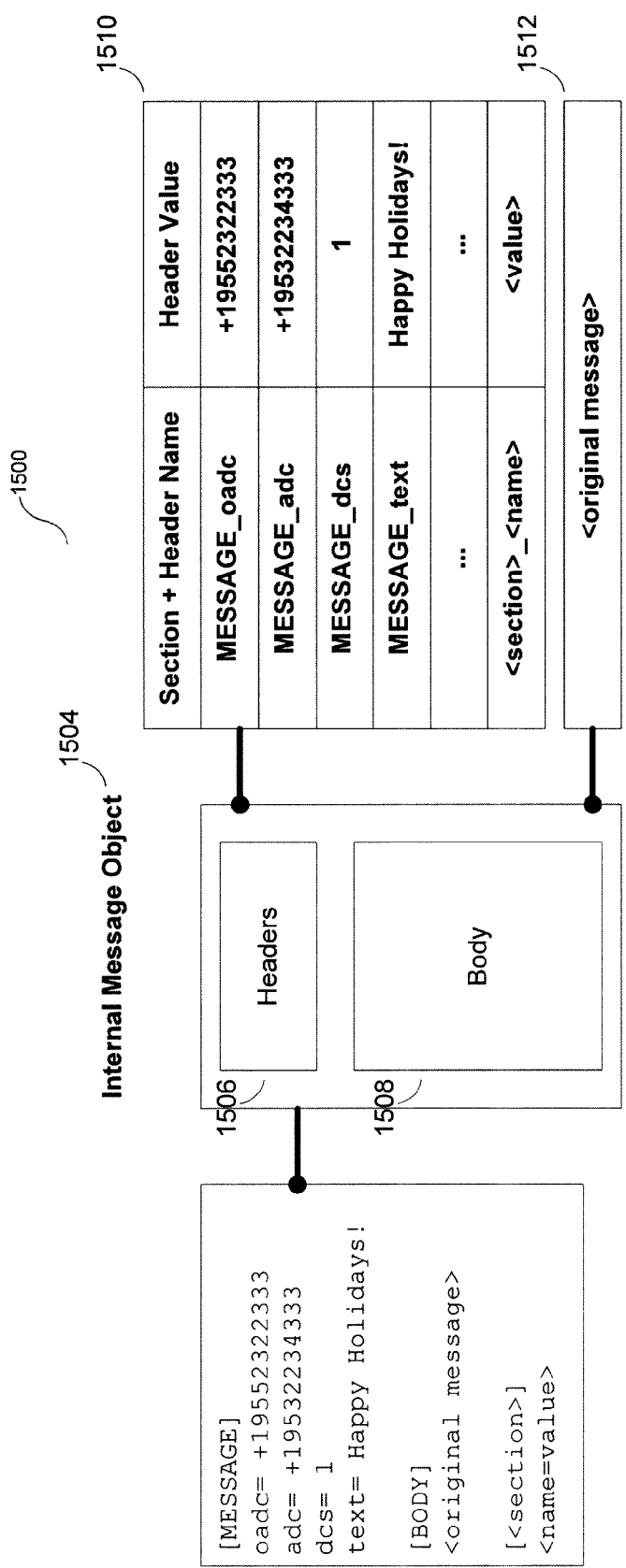
FIG. 15 illustrates aspects of an exemplary IMO.
Figure 18:
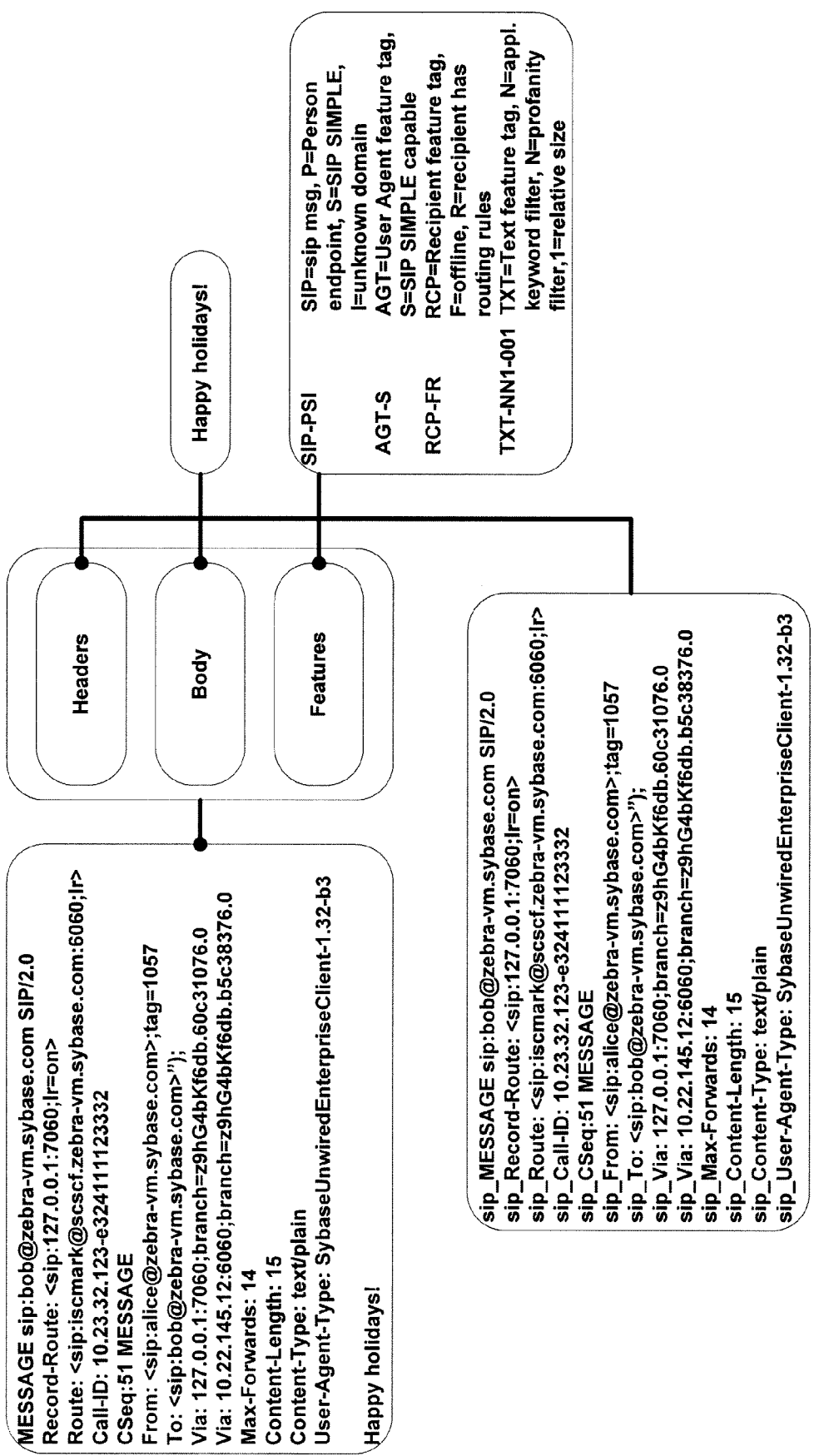
FIG. 18 depicts aspects of an exemplary IMO.

Within a MICV a flexible, extensible, and dynamically configurable IMO (see for example FIG. 13 and reference numeral 1300, FIG. 15 and reference numeral 1500, and FIG. 18) may be employed as an internal representation of a received quanta of data. An IMO (1302 and 1504) may logically contain possibly inter alia one or more headers (1304 and 1506), a body (1312 and 1508), etc. within which for example aspects of a received quanta of data may be preserved (1306→1310 and 1510→1512). An IMO may physically be realized through any combination of possibly inter alia proprietary data structures, Java Message Service (JMS) messages or objects, flat files, database entries, in-memory constructs, etc.

Figure 4:
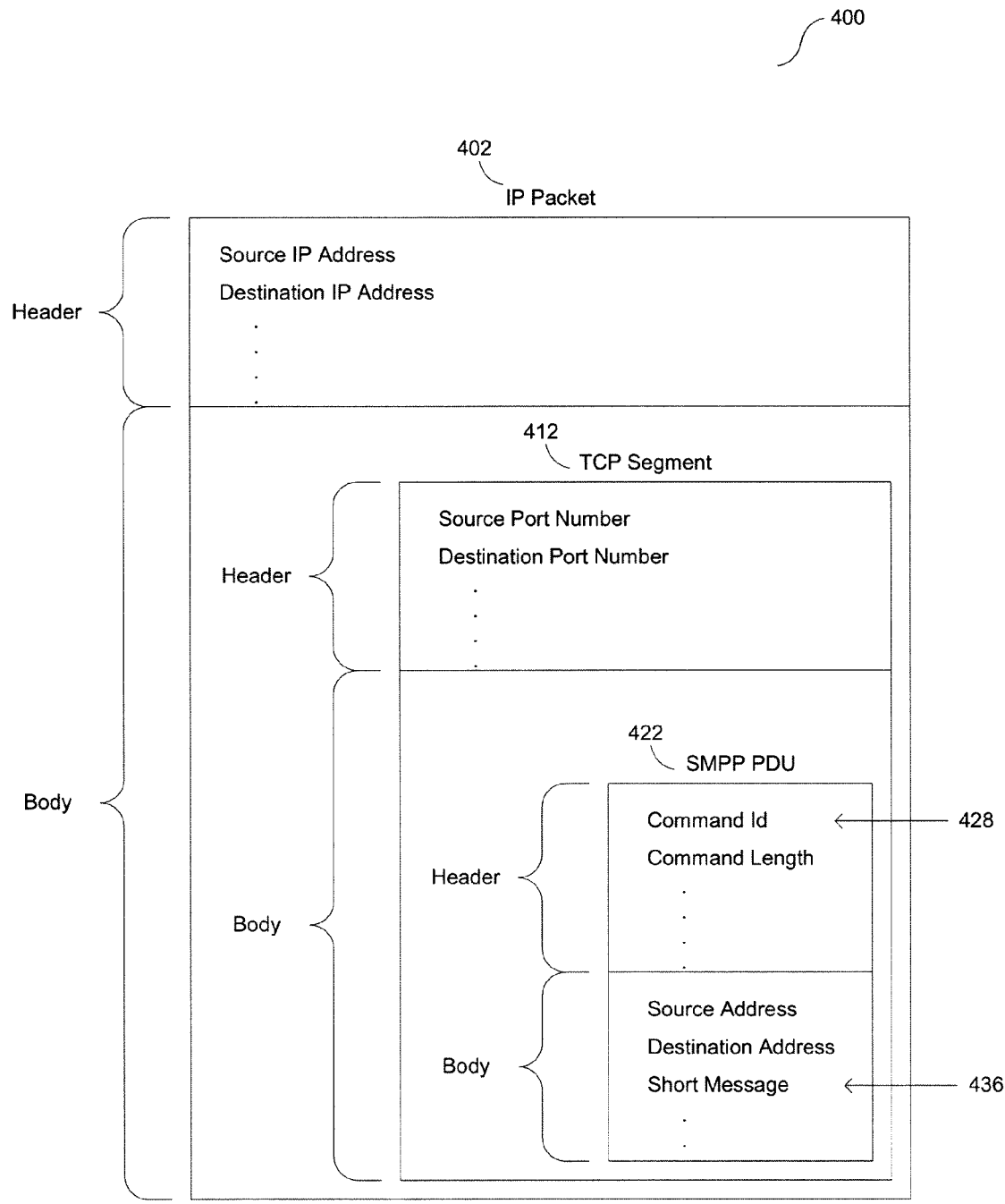
FIG. 4 illustrates aspects of an exemplary incoming SMS message received via an IP-based protocol.

For purposes of illustration, within an SMS context a MICV may support the receipt and dispatch of information through possibly inter alia Short Message Peer-to-Peer (SMPP) via Transmission Control Protocol (TCP)/IP and Mobile Application Part (MAP) via SS7. Under such a context:

1) FIG. 4 and reference numeral 400 depict an exemplary incoming SMS message received via for example SMPP with for example the data elements associated with the SMS message 428→436 encapsulated within a SMPP Protocol Data Unit (PDU 422) encapsulated within a TCP Segment 412 encapsulated within an IP Packet 402.

Figure 5:
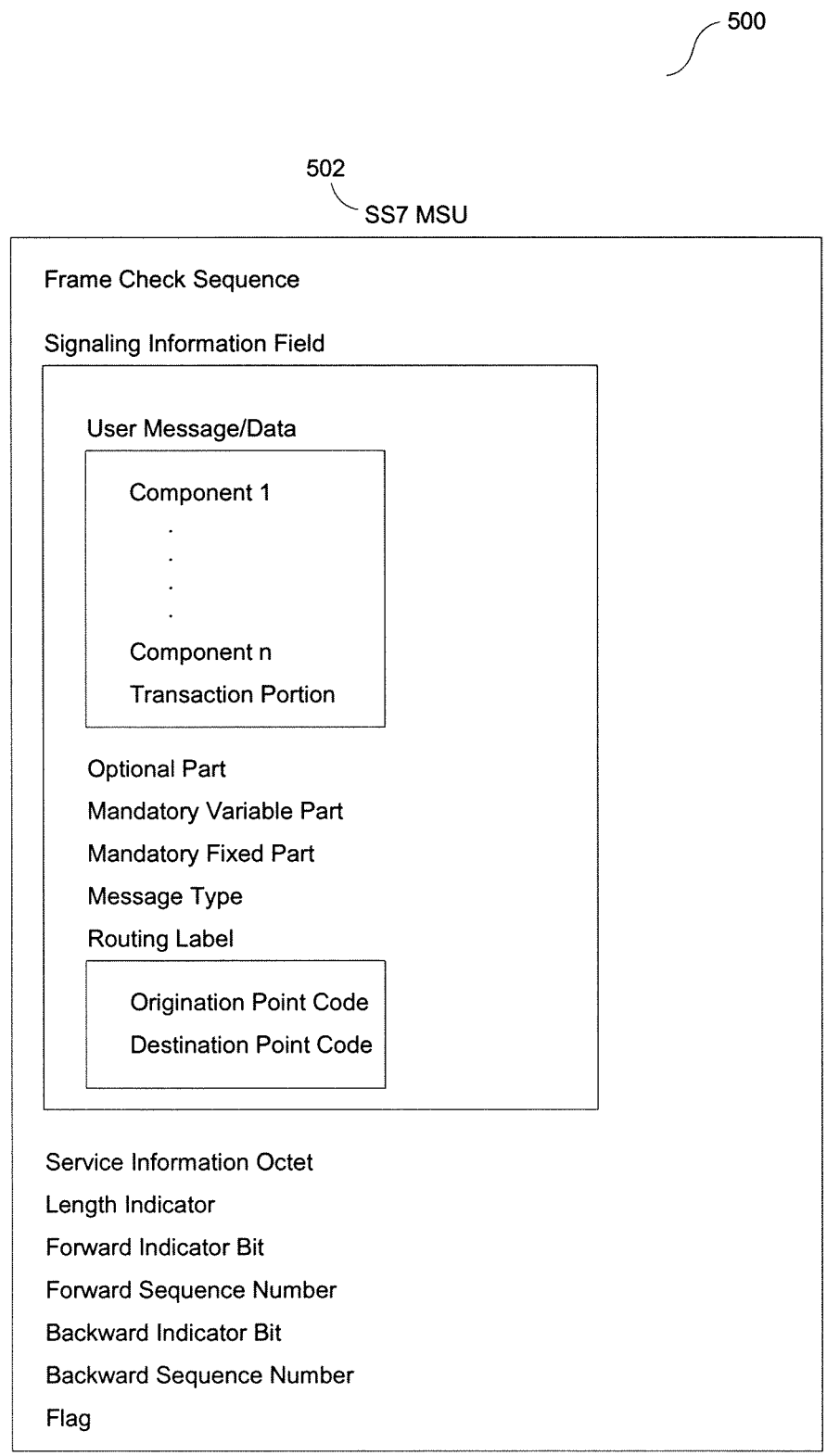
FIG. 5 illustrates aspects of an exemplary incoming SMS message received via Signaling System Number 7 (SS7).

2) FIG. 5 and reference numeral 500 depict an exemplary incoming SMS message received via for example MAP with for example the data elements associated with the SMS message encapsulated within a Message Signal Unit (MSU 502)

Figure 6:
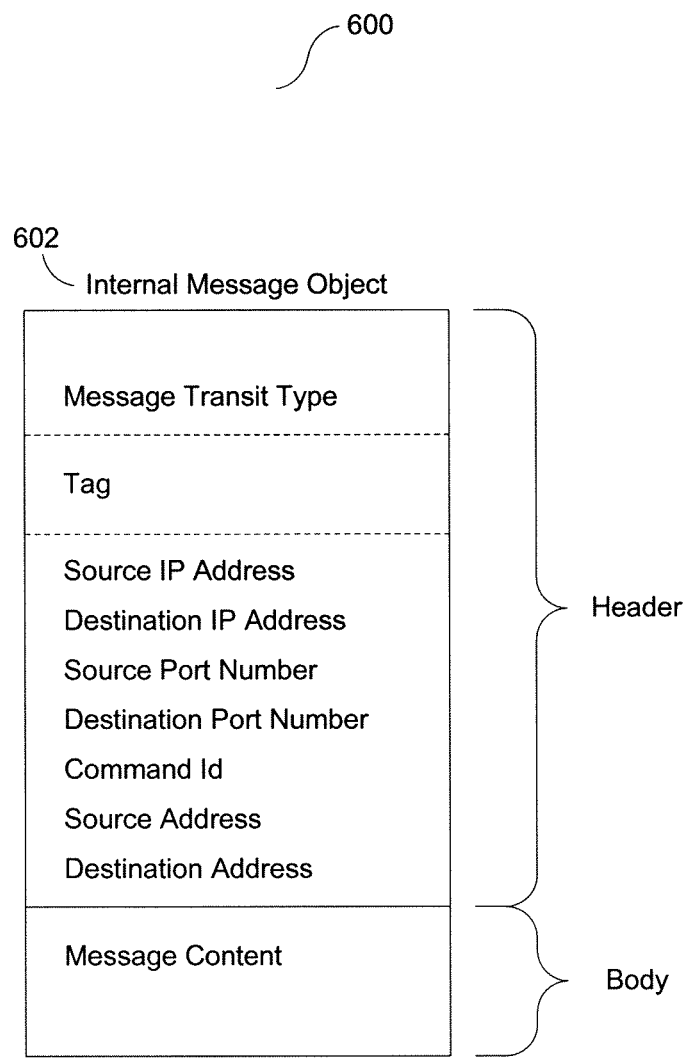
FIG. 6 illustrates aspects of a hypothetical Internal Message Object (IMO) that is possible in connection with an SMS message received via an IP-based protocol.
Figure 7:
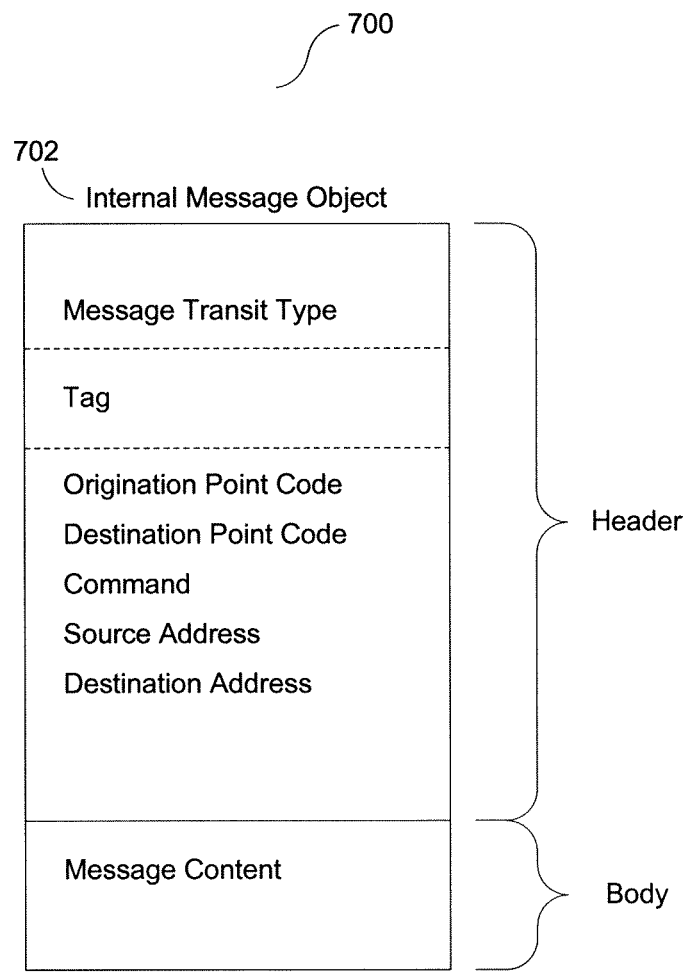
FIG. 7 illustrates aspects of a hypothetical IMO that is possible in connection with an SMS message received via SS7.

3) FIG. 6 and reference numeral 600 depict a hypothetical IMO 602 that is possible in support of an SMS message received via for example SMPP, and 4) FIG. 7 and reference numeral 700 depict a hypothetical IMO 702 that is possible in support of an SMS message received via for example MAP.

It will be readily apparent to one of ordinary skill in the art that numerous alternative arrangements, in connection with for example different contexts (such as inter alia MMS, VoIP, a voice call, signaling data, command-and-control data, software application data, etc.) and different communication protocols, are easily possible.

A MICV includes among other elements a vertically and horizontally scalable Protocol Engine (PE) layer (see for example reference point 1220 in FIG. 12) through which information may be received and/or transmitted using any combination of one or more of the supported communication protocols including inter alia SS7, TCP/IP, User Datagram Protocol (UDP)/IP, Really Simple Syndication (RSS), SMPP, Simple Mail Transfer Protocol (SMTP), HyperText Transfer Protocol (HTTP), Extensible Messaging and Presence Protocol (XMPP), MM4, MM7, SIP, GRX, etc.

Figure 12:
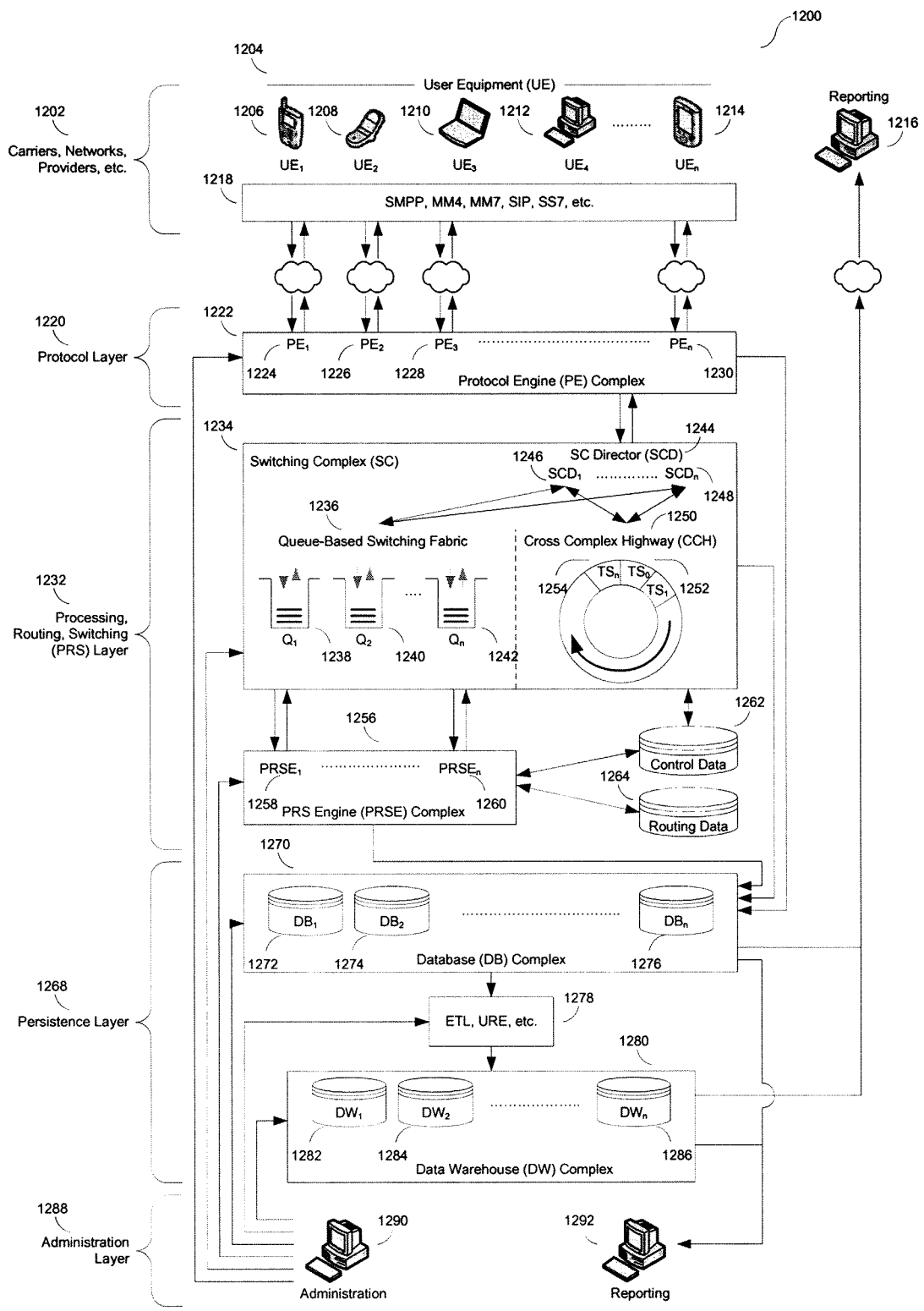
FIG. 12 depicts various of the elements that might be found in an exemplary MICV.

A PE layer may house a dynamically updateable set of one or more PEs ($PE_1$ 1224→$PE_n$ 1230 in the FIG. 12). A PE may, for example, leverage a body of flexible, extensible, and dynamically updateable configuration information as it completes its tasks, including possibly inter alia:

A) Receiving incoming and sending outgoing traffic using any combination of the supported communication protocols, paradigms, etc.

B) Performing various extraction, validation, editing, formatting, conversion, etc. operations on the elements of an incoming and/or outgoing data stream—e.g., source address, destination address, encoding indicators or flags, payload or body, etc. The specific elements that were just described are illustrative only and it will be readily apparent to one of ordinary skill in the relevant art that numerous other elements are easily possible and indeed are fully within the scope of the present invention.

C) Encapsulating various elements of an incoming data stream within an IMO and/or un-encapsulating various elements of an outgoing data stream from an IMO.

The catalog of PE processing steps that was described above is illustrative only and it will be readily apparent to one of ordinary skill in the relevant art that numerous other processing steps are easily possible and indeed are fully within the scope of the present invention.

A PE layer may be quickly and easily scaled either vertically (to for example add additional capacity in response to increases in demand [e.g., message volume]), horizontally (to for example add support for a new application-level communication protocol), or both.

A MICV includes among other elements a flexible, extensible, and dynamically configurable WorkFlow-based PRS layer (see reference numeral 1232 in FIG. 12). The WorkFlow elements of the PRS layer may be 'glued' together by a Message Routing Language (MRL, a full-featured scripting language that is based in part on the disclosures found in U.S. Pat. No. 6,735,586 entitled "System and Method for Dynamic Content Retrieval" and U.S. Pat. No. 7,240,067 entitled "System and Methodology for Extraction and Aggregation of Data from Dynamic Content") and may support among other things:

1) Processing. For example, the automatic and dynamic determination of the type of content (e.g., an SMS message, a VoIP data stream, a voice telephone call, signaling data, etc.) in a received quanta of data and the preservation of same in for example an IMO; content transcoding operations; billing activities (including possibly pricing/rating events); data logging and collection in support of reporting; the generation of a Feature Tag; etc.

2) Routing. For example, the authoritative resolution of destination and/or source addresses; the examination of available routes and the application of various criteria (possibly including for example MS WD location information, least cost routing rules, MS profile and preference information, route loadings, attributes of a received quanta of data [e.g., data type, size, etc.], QoS constraints, billing and revenue constraints, etc.) to available routes to arrive at a specific route selection; etc.

3) Switching. For example, directing (switching) based on a selected route data to an appropriate outbound delivery channel (see for example reference number 1234 in FIG. 12).

The catalog of activities that was described above is illustrative only and it will be readily apparent to one of ordinary skill in the relevant art that numerous other activities are easily possible and indeed are fully within the scope of the present invention.

Figure 20:
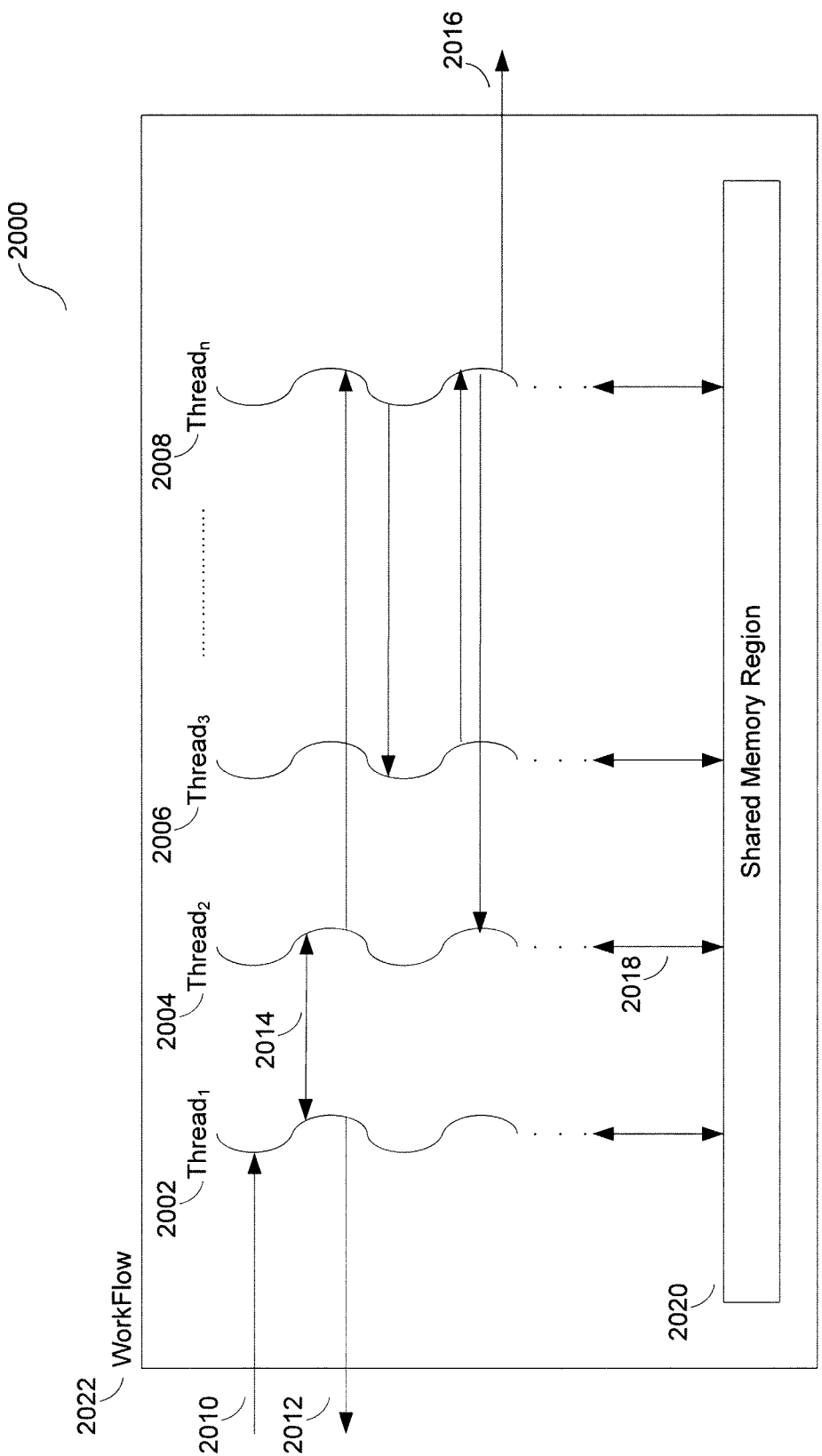
FIG. 20 depicts aspects of a hypothetical WorkFlow implementation that is possible under aspects of the present invention.

For purposes of illustration FIG. 20 and reference numeral 2000 depict aspects of a WorkFlow environment 2022 wherein possibly inter alia:

1) A dynamically adjustable number of threads (Thread$_1$ 2002, Thread$_2$ 2004, Thread$_3$ 2006, ... Thread$_n$ 2008) may be inter alia created, started, allowed to operate or execute, quiesced, stopped, destroyed, etc. under control of for example the WorkFlow environment 2022. Among other things one or more threads may for example realize aspects of one or more elements of a MICV (such as for example portions of a PE layer, portions of a PRS layer, etc.) and/or a single thread may for example realize aspects of one or more elements of a MICV (such as for example portions of a PE layer, portions of a PRS layer, etc.).

2) Different elements of a MICV (such as for example portions of a PE layer, portions of a PRS layer, etc.) may communicate, interact, etc. with various of the threads (Thread$_1$ 2002→Thread$_n$ 2008) (see for example 2010, 2012, and 2016).

3) Various of the threads (Thread$_1$ 2002→Thread$_n$ 2008) may among themselves communicate, interact, etc. (see for example 2014).

4) Various of the threads (Thread$_1$ 2002→Thread$_n$ 2008) may communicate, interact, etc. with inter alia a Shared Memory Region (2020) (see for example 2018).

The billing activities within the PRS layer may among other things yield a billing transaction. A billing transaction may take any number of forms and may involve different external entities (e.g., a carrier billing system, a carrier billing system service bureau, a credit or debit card clearinghouse, a financial institution, etc.). A billing transaction may include, possibly inter alia:

1) The appearance of a line item charge on the bill or statement that a MS receives from her WC.

2) The charging of a credit card or the debiting of a debit card.

3) The (electronic, etc.) transfer of funds.

4) The generation of an invoice, statement, etc.

Figure 14:
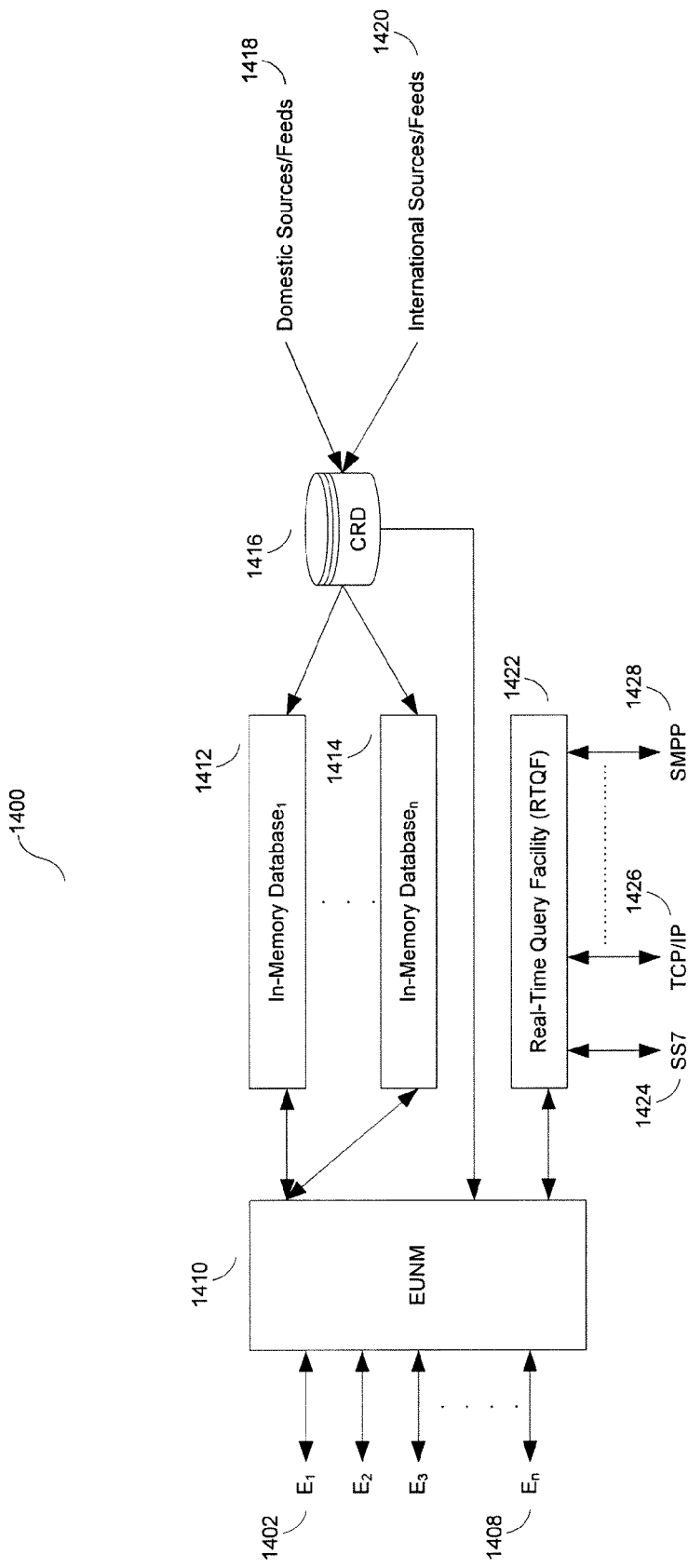
FIG. 14 illustrates aspects of an exemplary address resolution facility.

The Routing portion of a PRS layer may leverage a comprehensive, flexible, scalable, etc. lookup facility (indicated, albeit at a very high level, as Routing Data 1264 in FIG. 12) to support, possibly inter alia, its routing operations. Such a lookup facility may provide authoritative answers to inquiries like "At this moment in time what carrier services the Telephone Number (TN) 1-703-555-1212?", "What entity services the SIP address sip:john.doe@bigcompany.com?", etc. Among other things such a lookup facility may address (1) the complexities that are associated with all of the different TN numbering plans, schemes, etc. that exist around the world; (2) the complexities that arise with worldwide Mobile Number Portability (MNP) regimes; etc. A more detailed depiction of such a lookup facility is presented in FIG. 14 and reference numeral 1400. Such a lookup facility may consist of, possibly inter alia:

A) An Electronic Numbering (ENUM) façade 1410 through which possibly inter alia various PRSEs ($E_1$ 1402→$E_n$ 1408 in FIG. 14) may connect, submit routing inquiries, receive routing responses, etc.

B) A dynamically updateable set of one or more In-Memory Databases (In-Memory Database$_1$ 1412→In-Memory Database$_n$ 1414 in the diagram) that optionally house or host selected data (including, possibly inter alia, data from a Composite Routing Database [CRD] 1416) to provide, as one example, optimal performance.

C) A Real-Time Query Facility (RTQF) 1422 through which inquiries may be dispatched real-time to authoritative bodies (such as, for example, TN assignment administrators) around the world. A RTQF 1422 may support multiple communication channels, paradigms, protocols, etc. (such as, possibly inter alia, SS7 1424, TCP/IP 1426, UDP/IP, SMPP 1428, etc.).

D) A CRD 1416 containing comprehensive routing information for, possibly inter alia, TNs within all of the different TN numbering plans, schemes, etc. that exist around the world. A CRD 1416 may receive updates (e.g., dynamically, on a scheduled basis, etc.) from any number of sources or feeds including, possibly inter alia, domestic 1418 (such as, for example, from a Local Exchange Routing Guide [LERG], from one or more Number Portability Administration Centers [NPACs], etc.) and international 1420 (such as, for example, from Hong Kong, from the United Kingdom, etc.).

A lookup facility as described above may support a wide range of address types including among others a TN (such as 703-555-1234), a Short Code (SC, such as 46625), a SIP Uniform Resource Identifier (URI, such as sip:mark@mydomain.com), a Tel URI (such as tel:+19257652333), a Uniform Resource Locator (URL), etc.

The Routing portion of a PRS layer may include a flexible, extensible, and dynamically configurable intelligent routeback mechanism. Such a mechanism may inter alia support an entity (such as for example a WC) sending for example all of their out-of-network (e.g., SMS, MMS, etc.) traffic, data, etc. to a MICV with the intelligent routeback mechanism aiding in the:

1) Return (optionally augmented with various indicators and/or other data elements, optionally with various data elements transformed or manipulated, etc.) to the entity of that portion of the traffic, data, etc. that was received from the entity that the entity is able to deliver itself (e.g., where the entity has in place a bilateral agreement with a particular destination entity) for subsequent delivery by the entity.

2) Delivery, by the MICV, of that portion of the traffic, data, etc. that was received from the entity that the entity is unable to deliver itself (e.g., where the entity has no bilateral agreement with a particular destination entity).

An intelligent routeback mechanism may leverage inter alia aspects of a lookup facility as described above.

By way of hypothetical example involving an SMS message sent from one MS (whose WD has the TN 703-555-1234 and is serviced by WC ABC) to another MS (whose WD has the TN 301-555-9876 and is serviced by WC XYZ), an intelligent routeback mechanism may encompass inter alia the following activities:

1) Extracting one or more destination addresses from a received quanta of data. In the instant example the destination address (i.e., TN) 301-555-9876 would be extracted from the received SMS message.

2) Authoritatively identifying the entity (e.g., the WC) that services, supports, etc. each destination address. In the instant example WC XYZ would be identified as servicing the destination address (i.e., TN) 301-555-9876. This activity may involve inter alia one or more internal and/or external repository lookup operations (such as for example against a CRD), one or more queries (through for example a RTQF) against for example one or more WC HLRs, a combination of internal and/or external repository lookup operations and queries, etc.

For example, in connection with the processing of an SMS message a MICV may during this activity inter alia leverage a RTQF to: (a) dispatch a SendRoutingInformation (SRI) preparatory message (to for example a WC's HLR) and receive back a SRI Response message containing possibly among other things an International Mobile Subscriber Identity (IMSI) value and (b) dispatch a ForwardShortMessage (FSM) message, containing inter alia the returned IMSI value, to actually transfer, exchange, etc. the SMS message and receive back a FSM Response message. (The SRI message sequence and the FSM message sequence may take any number of forms including inter alia an American National Standards Institute [ANSI] LocationRequest, etc. as defined in the Telecommunications Industry Association [TIA]/Electronic Industries Alliance [EIA]-41-D specification) or an International Telecommunication Union [ITU] MAP_SEND_ROUTING_INFO, etc. as defined in the Q.771-Q.775 specifications).

3) Consulting a flexible, extensible, and dynamically configurable set of rules to determine inter alia whether to:

A) Route a received quanta of data back to the entity from which it was received (optionally augmented with various indicators and/or other data elements, optionally with various data elements transformed or manipulated, etc.) for possibly inter alia delivery by that entity to an appropriate destination.

B) Deliver a received quanta of data (optionally augmented with various indicators and/or other data elements, optionally with various data elements transformed or manipulated, etc.) to an appropriate destination.

The set of rules may take any number of forms and may among other things range from simple associations, such as for example:

| Source WC | Destination WC | Action |
|---|---|---|
| . | . | . |
| ABC | XYZ | Deliver |
| ABC | TUV | Routeback |
| . | . | . | to complicated sets of interrelated data.

In the instant example, the above simple association would result in possibly among other things delivery by the MICV of the SMS message (optionally augmented with various indicators and/or other data elements, optionally with various data elements transformed or manipulated, etc.) to WC XYZ.

The set of rules may be physically realized as any combination of one or more of inter alia flat files (such as for example text files, Comma-Separated Values [CSV] files, etc.), databases, specialized data structures, etc. with any one or more of same residing inside of and/or outside of computer memory.

The set of rules may optionally include a range of other information, logic, parameters, etc. including inter alia:

1) Informational, error, status, etc. codes. For example, logic, rules, data, etc. associated with the format, structure, content, etc. of one or more informational, error, status, etc. code values that may be generated, modified, etc. and which may optionally augment a received quanta of data. For example:

A) When routing a received quanta of data back to the entity from which it was received a MICV may include one or more error or other informational codes that may among other things be customizable based on inter alia various of the needs of the entity, various of the needs of the MICV, or a combination of same.

B) When delivering a received quanta of data a MICV may include one or more error or other informational codes that may among other things be customizable based on inter alia various of the needs of the destination entity, various of the needs of the MICV, or a combination of same.

Such codes may take any number of forms including simple (numeric, alphanumeric, textual, etc.) values, composite values, etc. For example, a hypothetical composite value might comprise four separate elements—Protocol User Error, Provider Error, Delivery Failure Cause, and Network Result—and be organized in any number of ways such as '50/0/0/0,' '50|0|0|0,' '50000000,' etc.

2) Data Transformations. For example, any portion of (e.g., any data element in) a received quanta of data may be manipulated, transformed, mapped, replaced, altered, etc. Illustrative portion (data element) examples include inter alia an IMSI value, a Mobile Subscriber Integrated Services Digital Network Number (MSISDN) value, a Mobile Switching Center (MSC) value, etc.

As just one simple example, consider an IMSI value. Among other things a 'real' IMSI value may be received by a MICV in for example a SRI Response message and, following various processing steps, may subsequently be included in for example other (e.g., FSM, etc.) messages that are dispatched by the MICV. Alternatively, an 'artificial' IMSI value (comprising inter alia static, dynamic, etc. values for each of a Mobile Country Code [MCC], a Mobile Network Code [MNC], and a Mobile Subscriber Identity Number [MSIN] with for example any or all of the values selected from, based on, derived from, etc. internal MICV equipment numbers, lookup tables, counters, index values, pointers, offsets, etc.) may be dynamically generated by a MICV and, following various processing steps, may subsequently be included in for example other (e.g., FSM) messages that are dispatched by a MICV.

3) Delivery channel. For example, one or more delivery channels may be identified by inter alia type (such as for example SS7, IP, etc.); by sub-type (e.g., MAP, SMPP, EMI/UCP, etc.); by absolute or relative address; by link, port, etc.; by alias; etc.

The set of rules may be dynamically administered (1) through any number of channels including inter alia WWW-based interfaces, APIs, etc. and (2) by any combination of inter alia MICV representative(s), external entity (e.g., WC) representative(s), etc.

Figure 8:
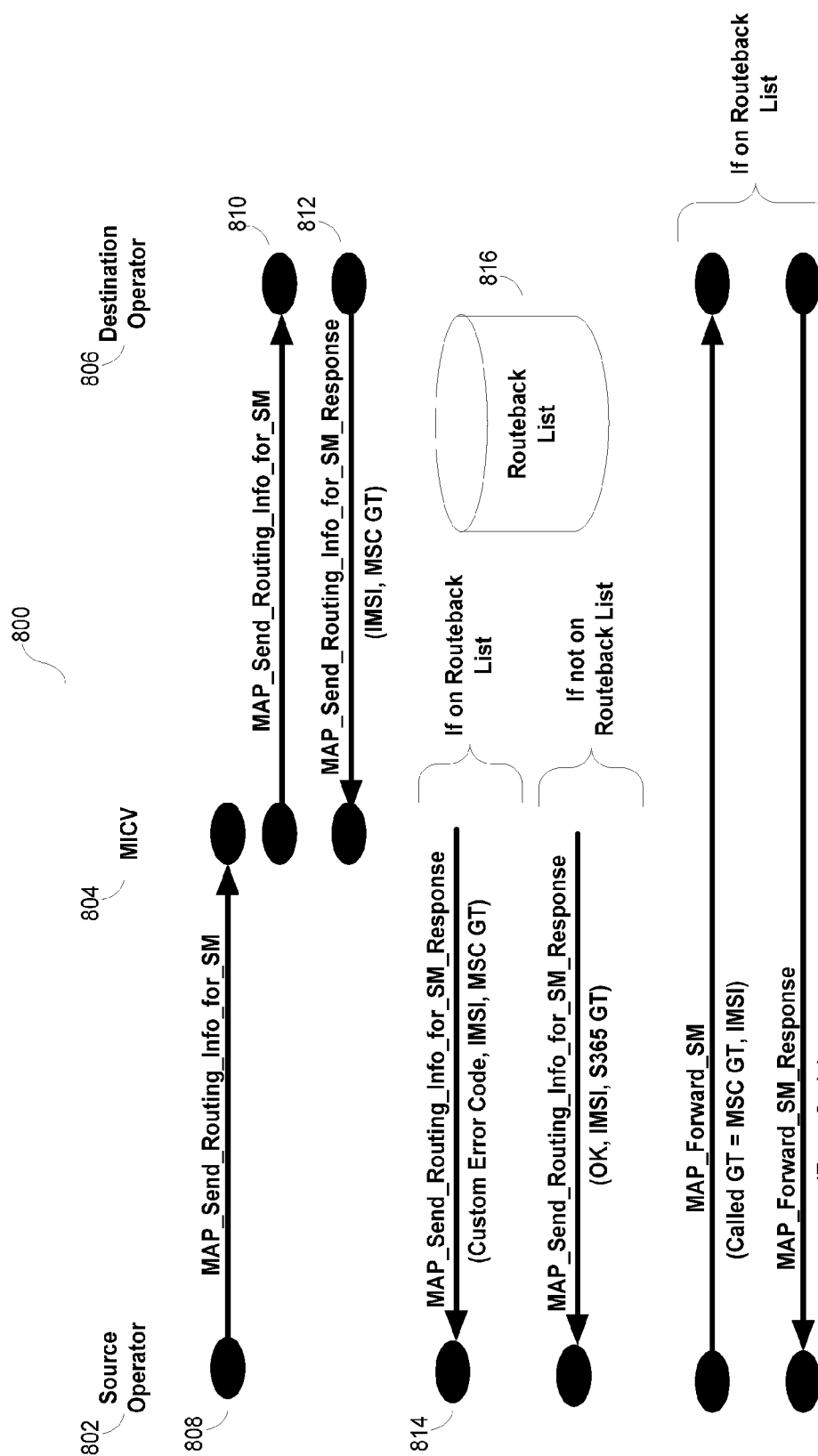
FIG. 8 illustrates various of the exchanges or interactions that may be possible under aspects of the present invention.

For purposes of illustration, FIG. 8 and reference numeral 800 capture various of the interactions or exchanges that might take place during the processing of an SMS message (sent from MS A, whose WD has the TN 703-555-1234 and is serviced by WC ABC ['Source Operator' 802 in the diagram], to MS B, whose WD has the TN 301-555-4567 and is serviced by WC PQR ['Destination Operator' 806 in the diagram]). Of interest and note in FIG. 8 are:

1) A repository 816 that may (a) be physically realized as any combination of one or more of inter alia flat files (such as for example text files, CSV files, etc.), databases, specialized data structures, etc., (b) contain inter alia a flexible, extensible, and dynamically configurable set of route/deliver rules such as those described above, static and/or dynamic data, etc., and (c) be populated, administered, etc. through any combination of one or more means including inter alia manual, automatic, programmatic, etc. via any combination of one or more channels including inter alia WWW-based interfaces, APIs, etc.

2) A MICV 804 receives a MAP_Send_Routing_Info_For_SM preparatory message from WC ABC (see 808).

3) After completing various processing activities (including possibly among other things extracting a destination address [the TN 301-555-4567] from the MAP_Send_Routing_Info_For_SM preparatory message and authoritatively identifying the WC [WC PQR] that services the destination address) the MICV dispatches a MAP_Send_Routing_Info_For_SM preparatory message (see 810) to the destination WC (WC PQR) and receives back a MAP_Send_Routing_Info_For_SM_Response message (see 812) containing possibly among other things an IMSI value for the destination WD (the WD that has the TN 301-555-4567) and an address of the MSC that currently services the destination WD.

4) After consulting a set of rules (including inter alia 816) the MICV returns to the source WC (WC ABC) a MAP_Send_Routing_Info_For_SM_Response message containing possibly among other things:

A) A custom error code, the IMSI value, and the address of the MSC that currently services the destination WD (see 814) for the 'route back' case (where WC ABC will subsequently deliver the SMS message), or B) An 'OK' error code, the IMSI value, and the address of a physical, virtual, etc. node, network element, etc. within the MICV 804 for the 'deliver' case (where the MISC will deliver the SMS message).

Figure 21:
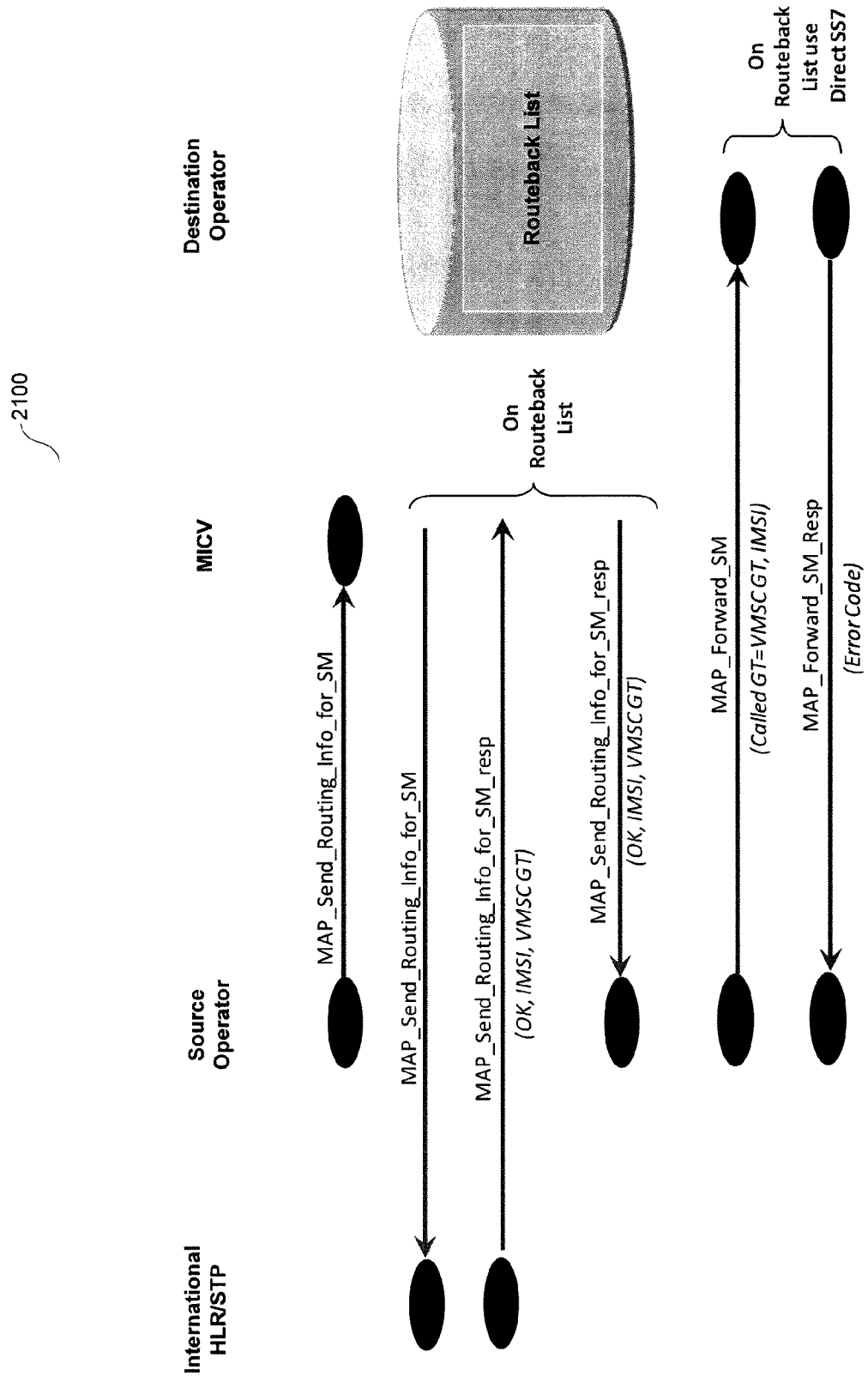
FIG. 21 illustrates various of the exchanges or interactions that may be possible under aspects of the present invention.

While FIG. 8 depicts an ITU-oriented set of exchanges or interactions it will be readily apparent to one of ordinary skill in the relevant art that other types, styles, protocol, etc. of exchanges or interactions (including inter alia an ANSI-oriented set, an IP-oriented set, etc.) are easily possible. For example, FIG. 21 and reference numeral 2100 depict various of the interactions or exchanges that might take place during the processing of an SMS message where aspects of the environment are IP-based.

The hypothetical examples that were presented above focused on an SMS message. It will be readily apparent to one of ordinary skill in the relevant art that numerous other paradigms are easily possible including inter alia MMS messages; IMS messages; SIP-addressed artifacts; application data; WAP-based exchanges; E-Mail messages; signaling, command-and-control, application, etc. data; IM messages; etc.

Figure 19:
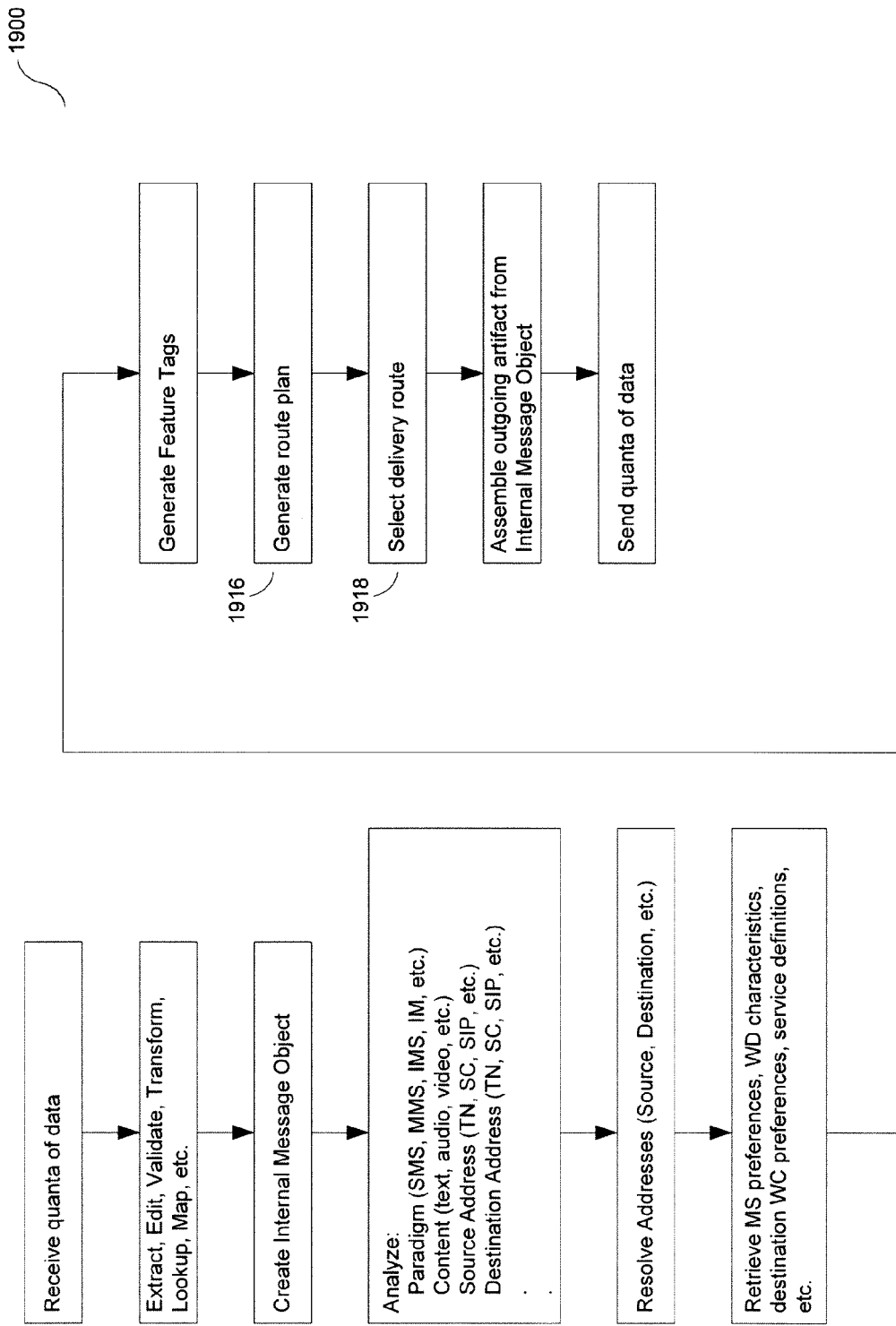
FIG. 19 depicts various of the activities that may take place under a Processing, Routing, and Switching (PRS) layer that is possible through aspects of the present invention.

For purposes of illustration, the flowchart that is presented in FIG. 19 and reference numeral 1900 depicts various of the activities that may take place under a hypothetical PRS layer that is possible through aspects of the present invention (with for example steps 1916 and steps 1918 capturing aspects of the various activities that may be carried out by an intelligent routeback mechanism).

The Databases 1262, 1264, 1272→1276, 1282→1286 that are depicted in FIG. 12 are a logical representation of the possibly multiple physical repositories that may be implemented to support, inter alia, configuration, routing, profile, monitoring, logging, reporting, etc. information. The physical repositories may be implemented through any combination of conventional Relational Database Management Systems (RDBMSs), through Object Database Management Systems (ODBMSs), through in-memory Database Management Systems (DBMSs), or through any other equivalent facilities.

The Administrator 1290 that is depicted in FIG. 12 provides management or administrative control over all of the different components of an environment through, as one example, a World Wide Web (WWW)-based interface. It will be readily apparent to one of ordinary skill in the relevant art that numerous other interfaces (e.g., a data feed, an Application Programming Interface [API], etc.) are easily possible.

A MICV may maintain one or more repositories (e.g., 1272→1276 and 1282→1286 in FIG. 12) into which selected details of all administrative, analytical, processing, routing, etc. activities; Transaction Detail Records (TDRs); the results of Extraction-Transformation-Load (ETL) operations; etc. may be recorded. Among other things, such repositories may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

Figure 17:
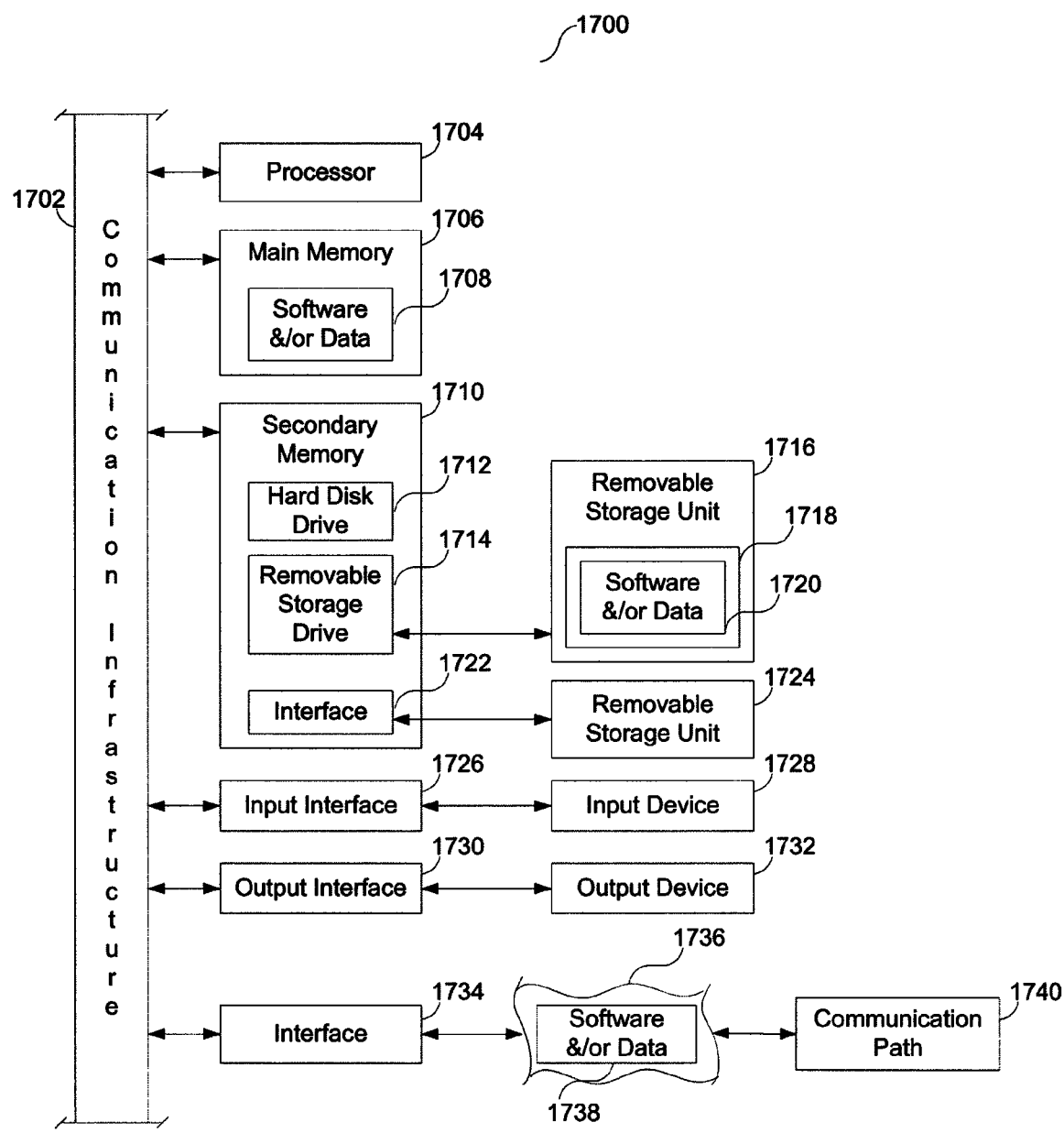
FIG. 17 depicts an exemplary computer system through which embodiments of aspects of the present invention may be implemented.

Various aspects of the present invention can be implemented by software, firmware, hardware, or any combination thereof. FIG. 17 illustrates an example computer system 1700 in which the present invention, or portions thereof, (such as described above under paragraphs 47-155) can be implemented as computer-readable code. Various embodiments of the invention are described in terms of this example computer system 1700. After reading this description, it will become apparent to a person skilled in the relevant art how to implement the invention using other computer systems and/or computer architectures.

Computer system 1700 includes one or more processors, such as processor 1704. Processor 1704 can be a special purpose processor or a general purpose processor. Processor 1704 is connected to a communication infrastructure 1702 (for example, a bus or a network).

Computer system 1700 also includes a main memory 1706, preferably Random Access Memory (RAM), containing possibly inter alia computer software and/or data 1708.

Computer system 1700 may also include a secondary memory 1710. Secondary memory 1710 may include, for example, a hard disk drive 1712, a removable storage drive 1714, a memory stick, etc. A removable storage drive 1714 may comprise a floppy disk drive, a magnetic tape drive, an optical disk drive, a flash memory, or the like. A removable storage drive 1714 reads from and/or writes to a removable storage unit 1716 in a well known manner. A removable storage unit 1716 may comprise a floppy disk, magnetic tape, optical disk, etc. which is read by and written to by removable storage drive 1714. As will be appreciated by persons skilled in the relevant art(s) removable storage unit 1716 includes a computer usable storage medium 1718 having stored therein possibly inter alia computer software and/or data 1720.

In alternative implementations, secondary memory 1710 may include other similar means for allowing computer programs or other instructions to be loaded into computer system 1700. Such means may include, for example, a removable storage unit 1724 and an interface 1722. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 1724 and interfaces 1722 which allow software and data to be transferred from the removable storage unit 1724 to computer system 1700.

Computer system 1700 may also include an input interface 1726 and a range of input devices 1728 such as, possibly inter alia, a keyboard, a mouse, etc.

Computer system 1700 may also include an output interface 1730 and a range of output devices 1732 such as, possibly inter alia, a display, one or more speakers, etc.

Computer system 1700 may also include a communications interface 1734. Communications interface 1734 allows software and/or data 1738 to be transferred between computer system 1700 and external devices. Communications interface 1734 may include a modem, a network interface (such as an Ethernet card), a communications port, a Personal Computer Memory Card International Association (PCMCIA) slot and card, or the like. Software and/or data 1738 transferred via communications interface 1734 are in the form of signals 1736 which may be electronic, electromagnetic, optical, or other signals capable of being received by communications interface 1734. These signals 1736 are provided to communications interface 1734 via a communications path 1740. Communications path 1740 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 1716, removable storage unit 1724, and a hard disk installed in hard disk drive 1712. Signals carried over communications path 1740 can also embody the logic described herein. Computer program medium and computer usable medium can also refer to memories, such as main memory 1706 and secondary memory 1710, which can be memory semiconductors (e.g. Dynamic Random Access Memory [DRAM] elements, etc.). These computer program products are means for providing software to computer system 1700.

Computer programs (also called computer control logic) are stored in main memory 1706 and/or secondary memory 1710. Computer programs may also be received via communications interface 1734. Such computer programs, when executed, enable computer system 1700 to implement the present invention as discussed herein. In particular, the computer programs, when executed, enable processor 1704 to implement the processes of aspects of the present invention, such as the steps discussed above under paragraphs 47-155. Accordingly, such computer programs represent controllers of the computer system 1700. Where the invention is implemented using software, the software may be stored in a computer program product and loaded into computer system 1700 using removable storage drive 1714, interface 1722, hard drive 1712 or communications interface 1734.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

In the discussion above mention reference was made on several occasions, for purposes of illustration, to SMS, MMS, etc. message traffic. Such references were not intended to be exhaustive or to limit the invention to the specific forms disclosed. It will be readily apparent to one of ordinary skill in the relevant art that numerous other quanta of data including inter alia IMS message, an E-Mail message, a VoIP data stream, a video data stream [e.g., a movie, a video conference call, etc.], a voice telephone call, signaling and other command-and-control data, an audio data stream [e.g., a song, etc.], IM data, games and other software applications, pictures and other static images, data from software applications such as games, etc. are easily possible and, indeed, are fully within the scope of the present invention.

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention The following list defines acronyms as used in this disclosure.

| Acronym | Meaning |
| --- | --- |
| A2P | Application-to-Peer |
| AMSI | American National Standards Institute |
| API | Application Programming Interface |
| AS | Application Server |
| CD-ROM | Compact Disc Read-Only Memory |
| CP | Content Provider |
| CRD | Composite Routing Database |
| CSCF | Call Session Control Function |
| CSV | Comma-Separated Values |
| DBMS | Database Management System |
| DH | Data Highway |
| DPE | Data Processing Engine |
| DRAM | Dynamic Random Access Memory |
| DSL | Digital Subscriber Line |
| EIA | Electronic Industries Alliance |
| E-Mail | Electronic Mail |
| ENUM | Electronic Numbering |
| EPROM | Erasable Programmable Read-Only Memory |
| ETL | Extraction-Transformation-Load |
| FSM | Forward Short Message |
| GIS | Geographic Information System |
| GPRS | General Packet Radio Service |
| GRX | GPRS Roaming Exchange |

-continued

| Acronym | Meaning |
| --- | --- |
| HSS | Home Subscriber Server |
| HTTP | HyperText Transfer Protocol |
| IM | Instant Messaging |
| IMO | Internal Message Object |
| IMS | IP Multimedia Subsystem |
| IMSI | International Mobile Subscriber Identity |
| IP | Internet Protocol |
| ITU | International Telecommunication Union |
| JMS | Java Message Service |
| LERG | Local Exchange Routing Guide |
| MAP | Mobile Application Part |
| MCC | Mobile Country Code |
| MEMS | Microelectromechanical Systems |
| MG | Media Gateway |
| MICV | Messaging Inter-Carrier Vendor |
| MMS | Multimedia Message Service |
| MMSC | Multimedia Message Service Center |
| MNC | Mobile Network Code |
| MNP | Mobile Number Portability |
| MRL | Message Routing Language |
| MS | Mobile Subscriber |
| MSC | Mobile Switching Center |
| MSIN | Mobile Subscriber Identify Number |
| MSISDN | Mobile Subscriber Integrated Services Digital Network Number |
| MSU | Message Signal Unit |
| NPAC | Number Portability Administration Center |
| ODBMS | Object Database Management System |
| P2P | Peer-to-Peer |
| PCMCIA | Personal Computer Memory Card International Association |
| PDA | Personal Digital Assistant |
| PDU | Protocol Data Unit |
| PE | Protocol Engine |
| PLMN | Public Land Mobile Network |
| PROM | Programmable Read-Only Memory |
| PRS | Processing, Routing, and Switching |
| PSTN | Public Switched Telephone Network |
| QoS | Quality of Service |
| RAM | Random Access Memory |
| RDBMS | Relational Database Management System |
| RF | Radio Frequency |
| RSS | Really Simple Syndication |
| RTQF | Real-Time Query Facility |
| SC | Short Code |
| SIP | Session Initiation Protocol |
| SLA | Service Level Agreement |
| SMPP | Short Message Peer-to-Peer |
| SMS | Short Message Service |
| SMSC | Short Message Service Center |
| SMTP | Simple Mail Transfer Protocol |
| SRI | Send Routing Information |
| SP | Service Provider |
| SS7 | Signaling System Seven |
| 3P | Third Party |
| TCP | Transmission Control Protocol |
| TDR | Transaction Detail Record |
| TIA | Telecommunications Industry Association |
| TN | Telephone Number |
| UDP | User Datagram Protocol |
| URI | Uniform Resource Identifier |
| URL | Uniform Resource Locator |
| VoIP | Voice Over IP |
| WAP | Wireless Application Protocol |
| WC | Wireless Carrier |
| WD | Wireless Device |
| WWW | World-Wide Web |
| XMPP | Extensible Messaging and Presence Protocol |

What is claimed is:

1. Within a message processing facility, logically disposed between a first wireless service provider and a second wireless service provider, a server-based method for directing a quanta of data, the server-based method comprising:
receiving, at the message processing facility, the quanta of data from a sending entity that includes at least the first wireless service provider, the quanta of data comprising a destination address and content;
based on the content, identifying a content type;
encapsulating at least the content, the content type and the destination address of the quanta of data in an internal message object (IMO);
identifying, using at least routing data and aspects of the destination address, a receiving entity that includes the second wireless service provider;
based on at least (a) a set of rules comprising delivery routes available to the sending entity and known to the message processing facility, (b) the receiving entity, and (c) the content type, augmenting, within the IMO, portions of the content to be sent to the receiving entity and portions of the content to be routed back to the sending entity with at least one of: one or more indicators, additional data elements and transformations of various data elements, de-encapsulating the content within the IMO, and returning, to the sending entity, a portion of the content that the sending entity is able to deliver itself before delivery of a portion of the content from the sending entity to the receiving entity that the sending entity is unable to deliver itself.

2. The server-based method of claim 1 wherein the content type is one of (a) a Short Message Service message, (b) a Multimedia Message Service message, (c) an IP Multimedia Subsystem message, (d) an E-Mail message, (e) audio data, (f) video data, (g) signaling data, or (h) application data.

3. The server-based method of claim 1 wherein the receiving step, the returning step, and the delivering step each utilize at least one of (a) an Internet Protocol or (b) Signaling System Seven.

4. The server-based method of claim 1 wherein the portion of the content returned to the sending entity is augmented with one or more new values.

5. The server-based method of claim 1 further comprising transforming the portion of the content that is returned to the sending entity.

6. The server-based method of claim 5 wherein transforming comprises the results of one or more transcoding operations.

7. The server-based method of claim 1 wherein the set of rules is operable to determine whether the sending entity is configured to deliver the quanta of data to the destination address without further assistance from the message processing facility.

8. The server-based method of claim 7 wherein the set of rules comprises an indication that the sending entity has a bilateral agreement with the receiving entity.

9. Within a message processing facility, logically disposed between a first wireless server provider and a second wireless service provider, a processor based system configured to direct a quanta of data, the processor-based system comprising:
a first gateway configured to receive the quanta of data from a sending entity that includes at least the first wireless service provider, the quanta of data comprising a destination address and content;
workflow modules configured to perform a plurality of processing steps including at least:
(a) based on the content, identifying a content a type,
(b) encapsulating at least the content, the content type and the destination address of the quanta of data in an internal message object (IMO),
(c) identifying, using at least routing data and aspects of the destination address, a receiving entity that includes the second wireless service provider, (d) based on at least (i) a set of rules comprising delivery routes available to the sending entity and known to the message processing facility, (ii) the receiving entity, and (iii) the content type, augmenting, within the IMO, portions of the content to be sent to the receiving entity and portions of the content to be routed back to the sending entity with least one of: one or more indicators, additional data elements and transformations of data elements, de-encapsulating the content within the IMO, and returning via a second gateway, to the sending entity, a portion of the content that the sending entity is able to deliver itself before delivery of a portion of the content from the sending entity to the receiving entity that the sending entity is unable to deliver itself;

a repository configured to preserve aspects of the results of the plurality of processing steps; and an administrator configured to control the workflow modules.

10. The processor-based system of claim 9 wherein the content type is one of (a) a Short Message Service message, (b) a Multimedia Message Service message, (c) an IP Multimedia Subsystem message, (d) an E-Mail message, (e) audio data, (f) video data, (g) signaling data, or (h) application data.

11. The processor-based system of claim 9 wherein the first gateway and the second gateway are realized as either (a) one single device or (b) two or more separate devices.

12. The processor-based system of claim 11 wherein the realization supports at least one of (a) an Internet Protocol or (b) Signaling System Seven.

13. The processor-based system of claim 9 wherein the portion of the content returned to the sending entity is augmented with one or more new values.

14. The processor-based system of claim 9 wherein the portion of the content returned to the sending entity is transformed.

15. The processor-based system of claim 14 wherein the portion of the content is transformed using results of one or more transcoding operations.

16. The processor-based system of claim 9 wherein the set of rules is operable to determine whether the sending entity is configured to deliver the quanta of data to the destination address without further assistance from the message processing facility.

17. The processor-based system of claim 16 wherein the set of rules comprises an indication that the sending entity has a bilateral agreement with the receiving entity.

* * * * *